United States Patent
Choi et al.

(10) Patent No.: US 12,240,323 B2
(45) Date of Patent: Mar. 4, 2025

(54) VEHICLE CONTROL DEVICE AND CONTROL METHOD THEREFOR

(71) Applicant: LG ELECTRONICS INC., Seoul (KR)

(72) Inventors: Sunghwan Choi, Seoul (KR); Dukyung Jung, Seoul (KR); Yujung Jang, Seoul (KR); Byeongjun Choi, Seoul (KR); Yeonsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 17/757,670

(22) PCT Filed: Dec. 11, 2020

(86) PCT No.: PCT/KR2020/018170
§ 371 (c)(1),
(2) Date: Jun. 17, 2022

(87) PCT Pub. No.: WO2021/125706
PCT Pub. Date: Jun. 24, 2021

(65) Prior Publication Data
US 2023/0012932 A1    Jan. 19, 2023

Related U.S. Application Data

(60) Provisional application No. 62/949,927, filed on Dec. 18, 2019.

(51) Int. Cl.
*B60K 35/00*    (2024.01)
*B60W 40/076*    (2012.01)
(Continued)

(52) U.S. Cl.
CPC .......... *B60K 35/00* (2013.01); *B60W 40/076* (2013.01); *B60W 50/14* (2013.01); *B60K 35/28* (2024.01);
(Continued)

(58) Field of Classification Search
None
See application file for complete search history.

(56) References Cited

U.S. PATENT DOCUMENTS

2010/0161212 A1*  6/2010  Han ................... G01C 21/3638
                                                         701/533
2015/0120179 A1*  4/2015  Miyata ................. G01C 21/36
                                                         701/408
(Continued)

FOREIGN PATENT DOCUMENTS

JP    2002168637 A  *  6/2002
JP    2017126142        7/2017
(Continued)

OTHER PUBLICATIONS

Machine translation of JP-2002168637-A (Year: 2002).*
(Continued)

*Primary Examiner* — Amelia Vorce
*Assistant Examiner* — Kyle S Park
(74) *Attorney, Agent, or Firm* — LEE, HONG, DEGERMAN, KANG & WAIMEY

(57) ABSTRACT

The present invention provides a vehicle control device and a control method therefor. A vehicle control device according to one embodiment of the present invention comprises: an interface unit communicatively connected to a display unit provided in a vehicle; and a processor for controlling the
(Continued)

display unit provided in the vehicle through the interface unit, wherein the processor receives destination information through the interface unit, acquires, from map information, spatial coordinates of a building corresponding to the destination information, and controls, on the basis of the spatial coordinates of the building corresponding to the destination information, the display unit so that a graphic object related to the destination information overlaps with the building and is displayed.

19 Claims, 40 Drawing Sheets

(51) Int. Cl.
*B60W 50/14* (2020.01)
*B60K 35/28* (2024.01)
*B60K 35/29* (2024.01)
*B60K 35/81* (2024.01)

(52) U.S. Cl.
CPC .............. *B60K 35/29* (2024.01); *B60K 35/81* (2024.01); *B60K 2360/166* (2024.01); *B60K 2360/176* (2024.01); *B60K 2360/1868* (2024.01); *B60W 2050/146* (2013.01); *B60W 2420/403* (2013.01); *B60W 2552/15* (2020.02); *B60W 2556/40* (2020.02)

(56) References Cited

U.S. PATENT DOCUMENTS

| | | | |
|---|---|---|---|
| 2017/0184848 | A1 | 6/2017 | Vallius |
| 2019/0180485 | A1* | 6/2019 | Kim ........................ G06V 20/20 |

FOREIGN PATENT DOCUMENTS

| | | |
|---|---|---|
| JP | 2019095213 | 6/2019 |
| KR | 1020130137063 | 12/2013 |
| KR | 10-2018-0026241 | 3/2018 |
| KR | 1020190078676 | 7/2019 |

OTHER PUBLICATIONS

PCT International Application No. PCT/KR2020/018170, International Search Report dated Mar. 5, 2021, 3 pages.
Korean Intellectual Property Office Application No. 10-2022-7000877, Office Action dated Jul. 30, 2024, 8 pages.

* cited by examiner

FIG. 11A

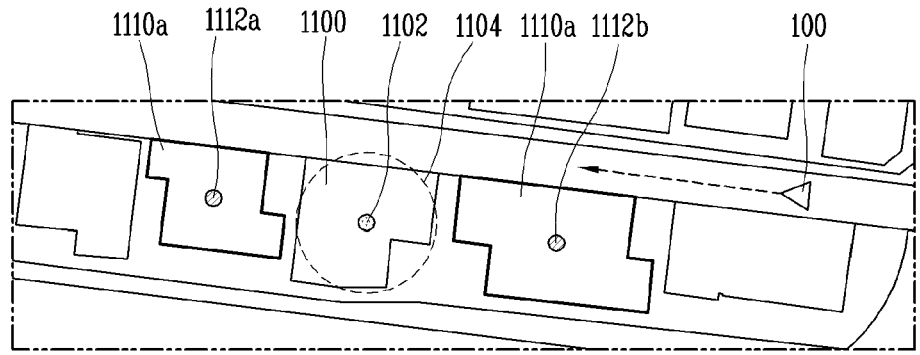

◁----- POSITION OF USER'S VEHICLE AND TRAVELING DIRECTION
▢ FOOTPRINTS OF ADJACENT CANDIDATE BUILDINGS ON MAP
⊘ CENTER POSITION OF ADJACENT CANDIDATE BUILDINGS ON MAP
○ SEARCHED POI CENTER POINT (NO BUILDING SHAPE)
◌ REGION WHERE SEARCHED POI BUILDING SHAPE CAN EXIST

FIG 11B

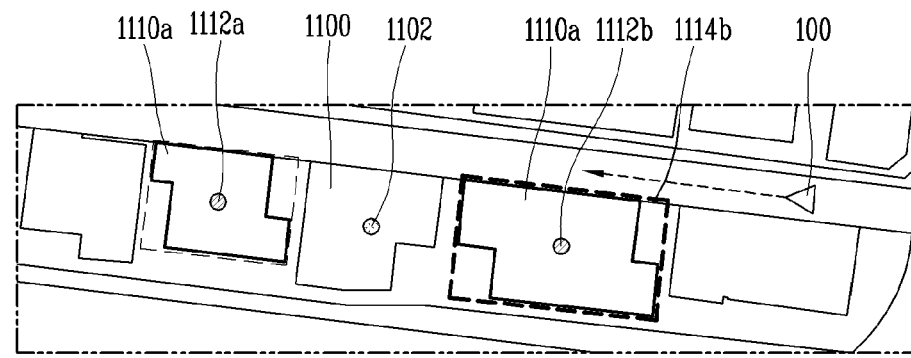

◁----- POSITION OF USER'S VEHICLE AND TRAVELING DIRECTION
▢ FOOTPRINTS OF ADJACENT CANDIDATE BUILDINGS ON MAP
⊘ CENTER POSITION OF ADJACENT CANDIDATE BUILDINGS ON MAP
○ SEARCHED POI CENTER POINT (NO BUILDING SHAPE)
◌ REGION WHERE SEARCHED POI BUILDING SHAPE CAN EXIST
▭ BOUNDING BOX OF FIRST CANDIDATE BUILDING
▭ BOUNDING BOX OF SECOND CANDIDATE BUILDING

← → STRAIGHT LINES GENERATED ALONG EACH SURFACE OF QUADRANGULAR BOUNDING BOX OF FIRST CANDIDATE BUILDING

← → STRAIGHT LINES GENERATED ALONG EACH SURFACE OF QUADRANGULAR BOUNDING BOX OF SECOND CANDIDATE BUILDING

◁ - - - POSITION OF USER'S VEHICLE AND TRAVELING DIRECTION
☐ FOOTPRINTS OF ADJACENT CANDIDATE BUILDINGS ON MAP
⊚ CENTER POSITION OF ADJACENT CANDIDATE BUILDINGS ON MAP
◉ SEARCHED POI CENTER POINT (NO BUILDING SHAPE)
▨ QUADRANGLE WITH MINIMUM AREA = ESTIMATED POI BUILDING SHAPE

FIG. 12A

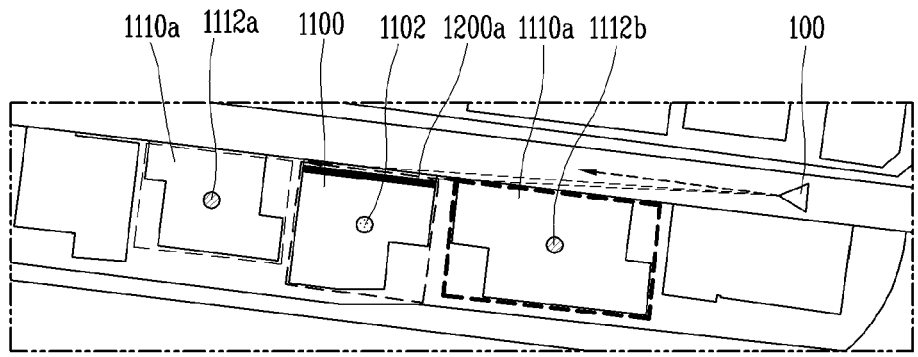

- ◁----- POSITION OF USER'S VEHICLE AND TRAVELING DIRECTION
- ⊙ CENTER POSITION OF ADJACENT CANDIDATE BUILDINGS ON MAP
- ○ SEARCHED POI CENTER POINT (NO BUILDING SHAPE)
- ⌐ ⌐ BOUNDING BOX OF SECOND CANDIDATE BUILDING
- ⌐ ⌐ BOUNDING BOX OF SEARCHED POI BUILDING
- ▬ ONE SURFACE OF BOUNDING BOX OF SEARCHED POI BUILDING
- ← STRAIGHT LINE TO VERTEX OF SURFACE OF BOUNDING BOX FROM ORIGIN OF CAMERA

FIG. 12B

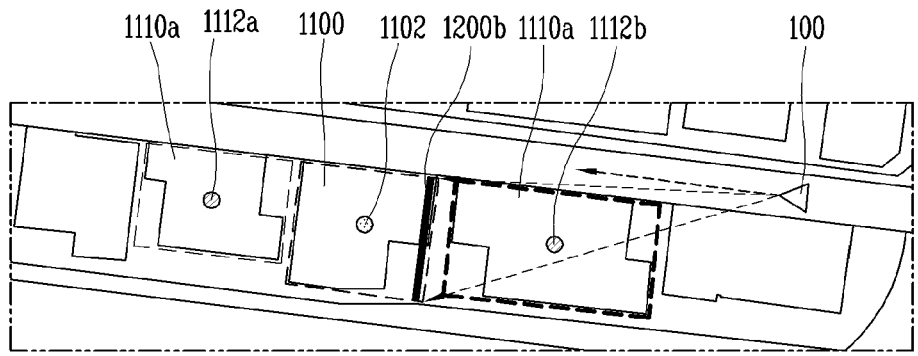

- ◁----- POSITION OF USER'S VEHICLE AND TRAVELING DIRECTION
- ⊙ CENTER POSITION OF ADJACENT CANDIDATE BUILDINGS ON MAP
- ○ SEARCHED POI CENTER POINT (NO BUILDING SHAPE)
- ⌐ ⌐ BOUNDING BOX OF SECOND CANDIDATE BUILDING
- ⌐ ⌐ BOUNDING BOX OF SEARCHED POI BUILDING
- ▬ ONE SURFACE OF BOUNDING BOX OF SEARCHED POI BUILDING
- ←-- STRAIGHT LINE TO VERTEX OF SURFACE OF BOUNDING BOX FROM ORIGIN OF CAMERA

FIG. 12C

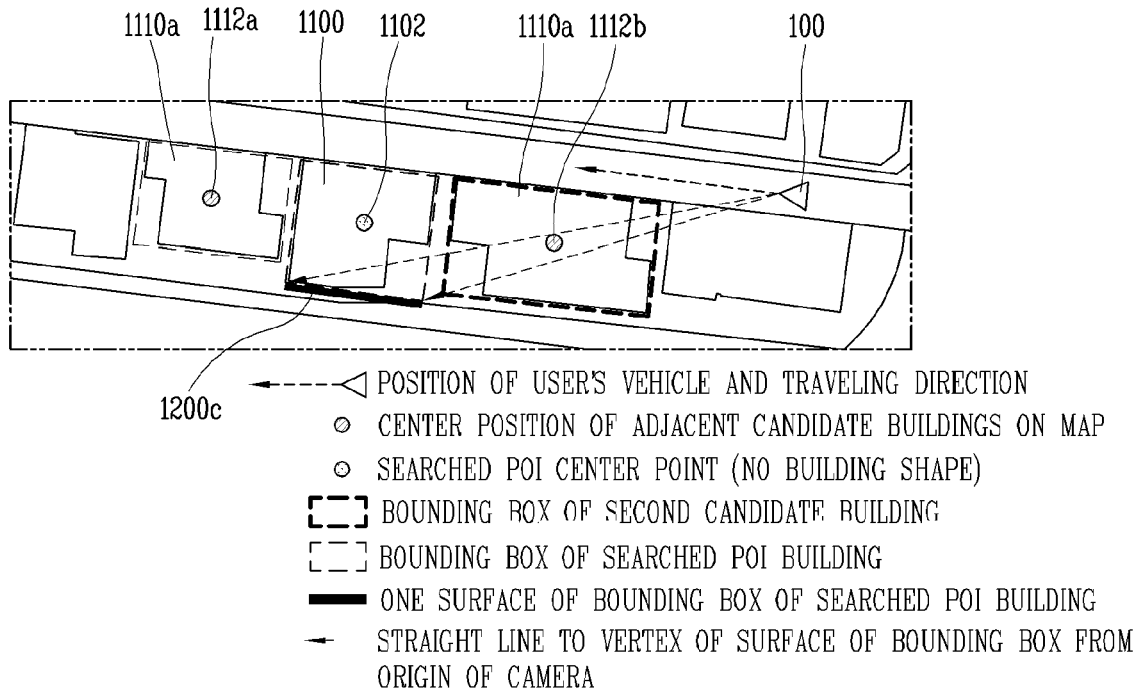

←---◁ POSITION OF USER'S VEHICLE AND TRAVELING DIRECTION
⊙ CENTER POSITION OF ADJACENT CANDIDATE BUILDINGS ON MAP
○ SEARCHED POI CENTER POINT (NO BUILDING SHAPE)
⌐ ¬ BOUNDING BOX OF SECOND CANDIDATE BUILDING
⌐ ¬ BOUNDING BOX OF SEARCHED POI BUILDING
━ ONE SURFACE OF BOUNDING BOX OF SEARCHED POI BUILDING
← STRAIGHT LINE TO VERTEX OF SURFACE OF BOUNDING BOX FROM ORIGIN OF CAMERA

FIG 12D

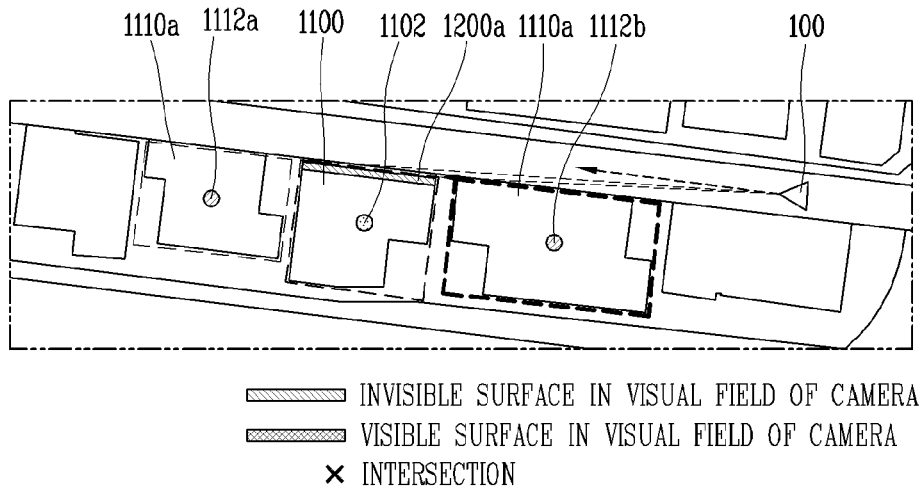

▨ INVISIBLE SURFACE IN VISUAL FIELD OF CAMERA
▭ VISIBLE SURFACE IN VISUAL FIELD OF CAMERA
× INTERSECTION

FIG. 13A
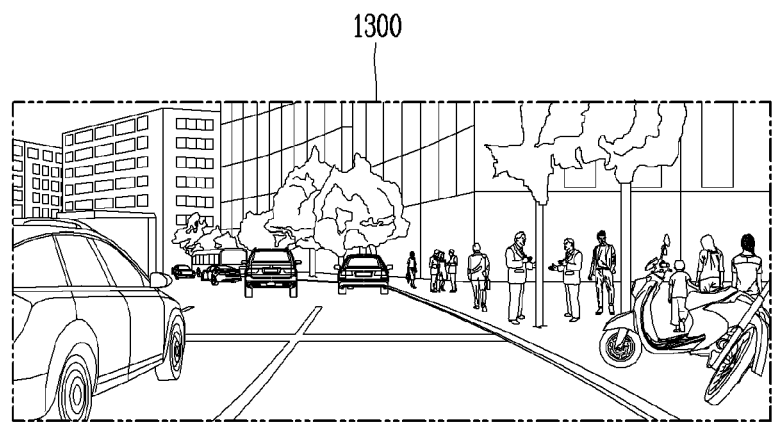
(a)
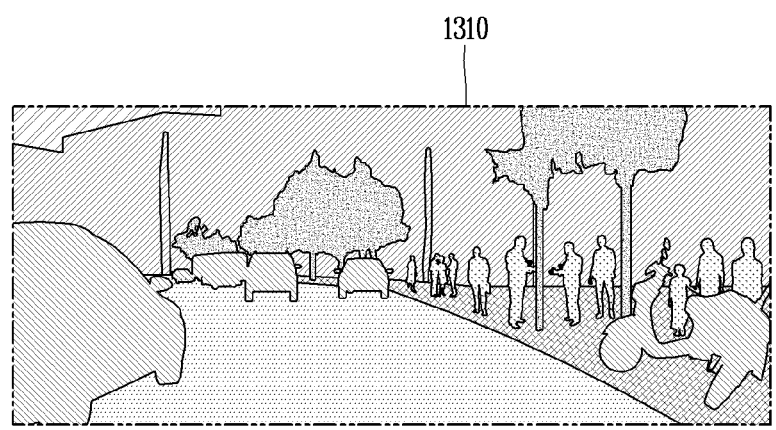
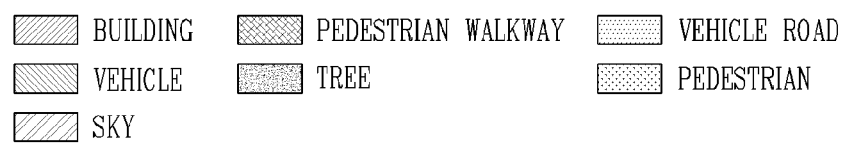
(b)

FIG. 13E
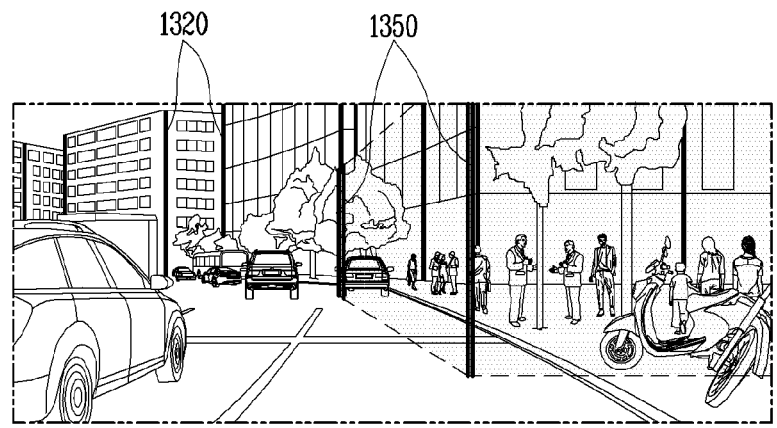
(a)
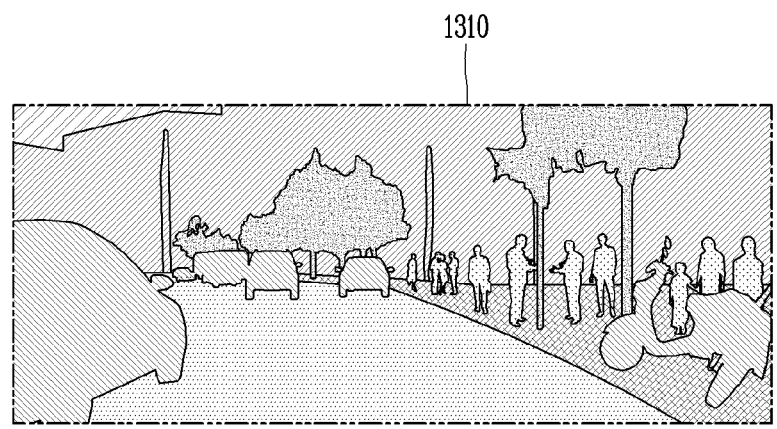
(b)

FIG. 13G
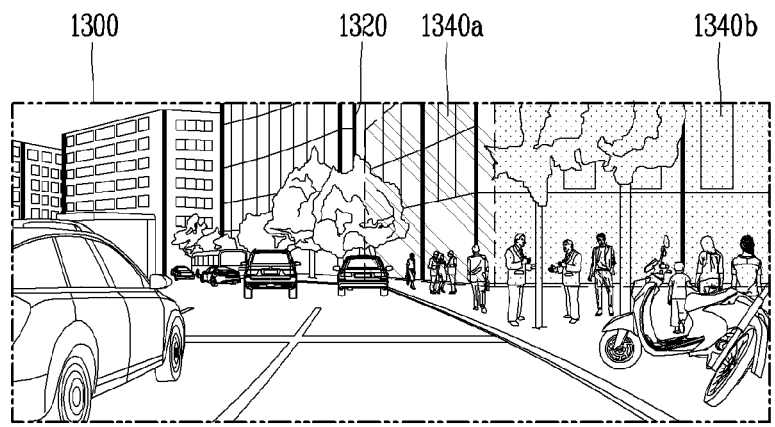
(a)
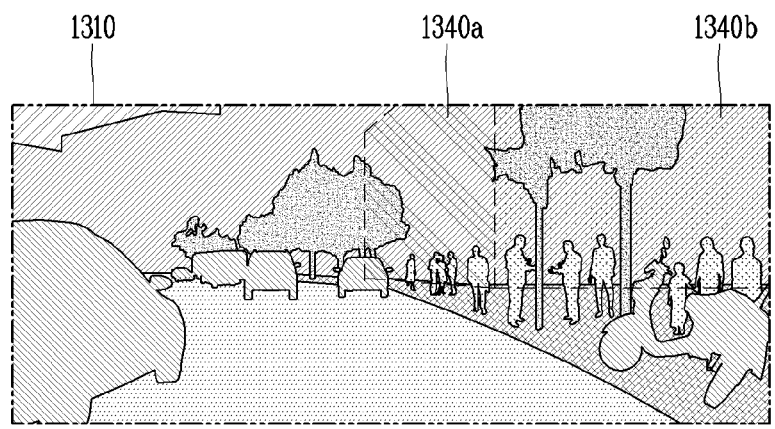
(b)

FIG. 14C
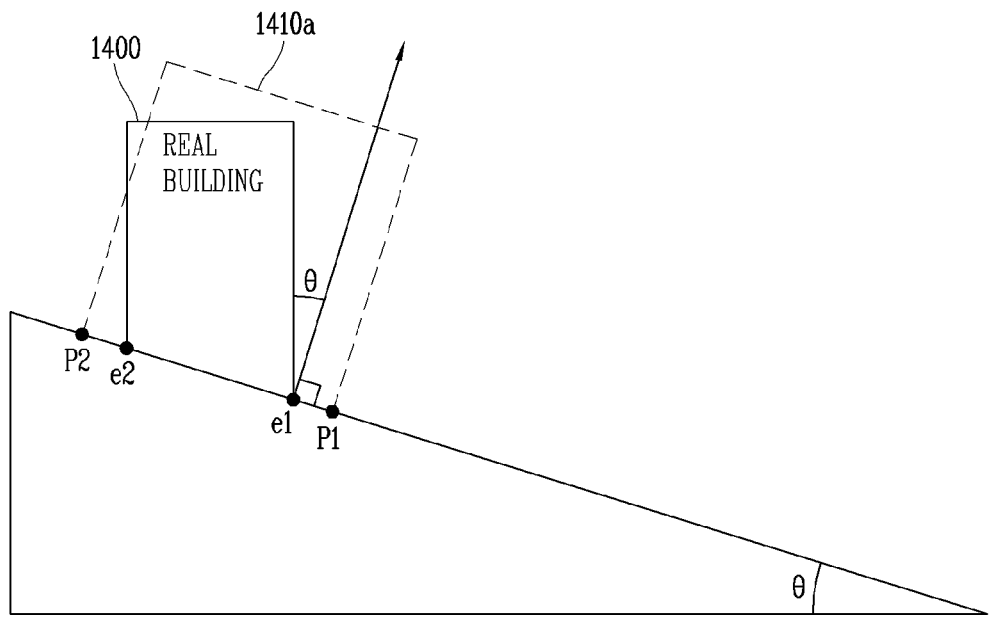
(a)
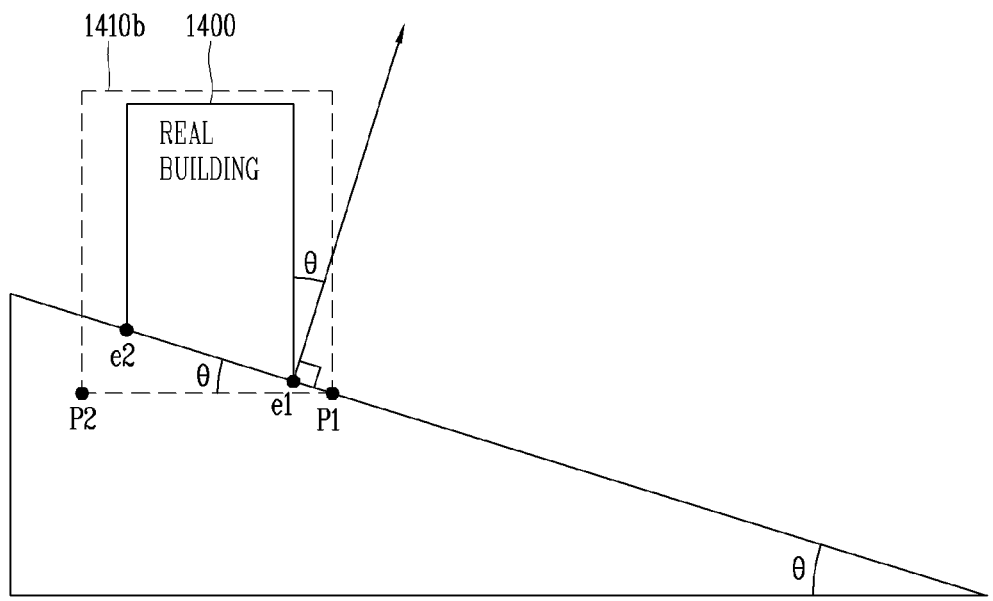
(b)

FIG. 16B
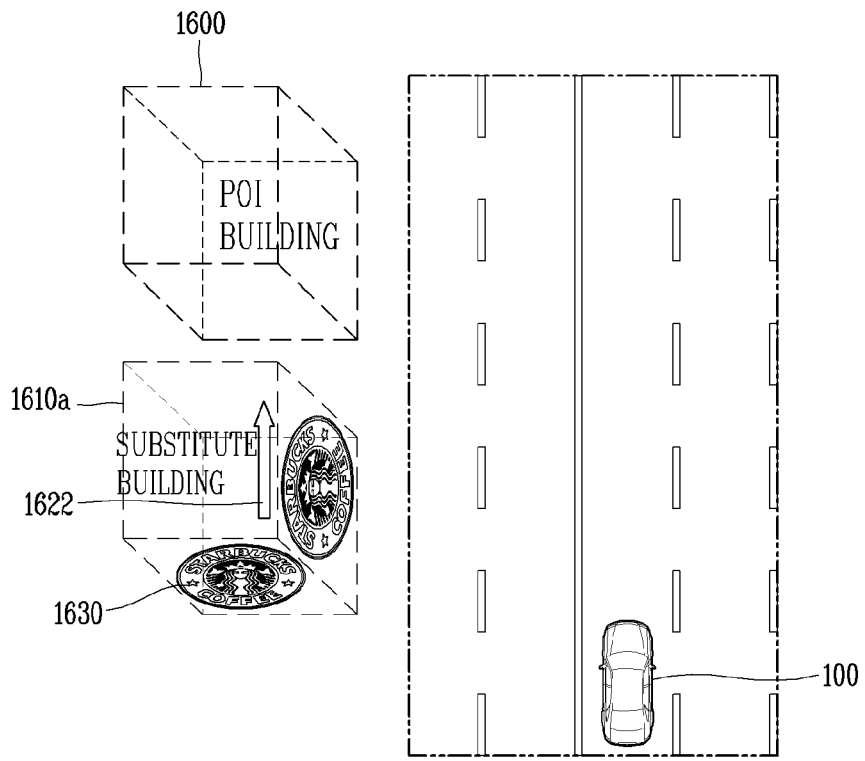
(a)
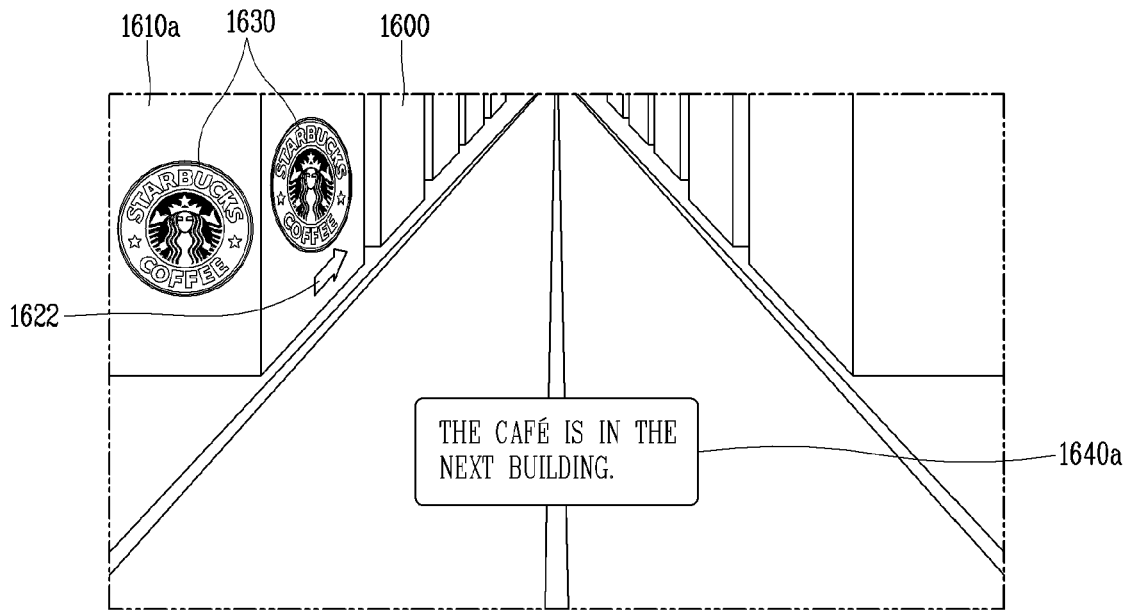
(b)

FIG. 16C
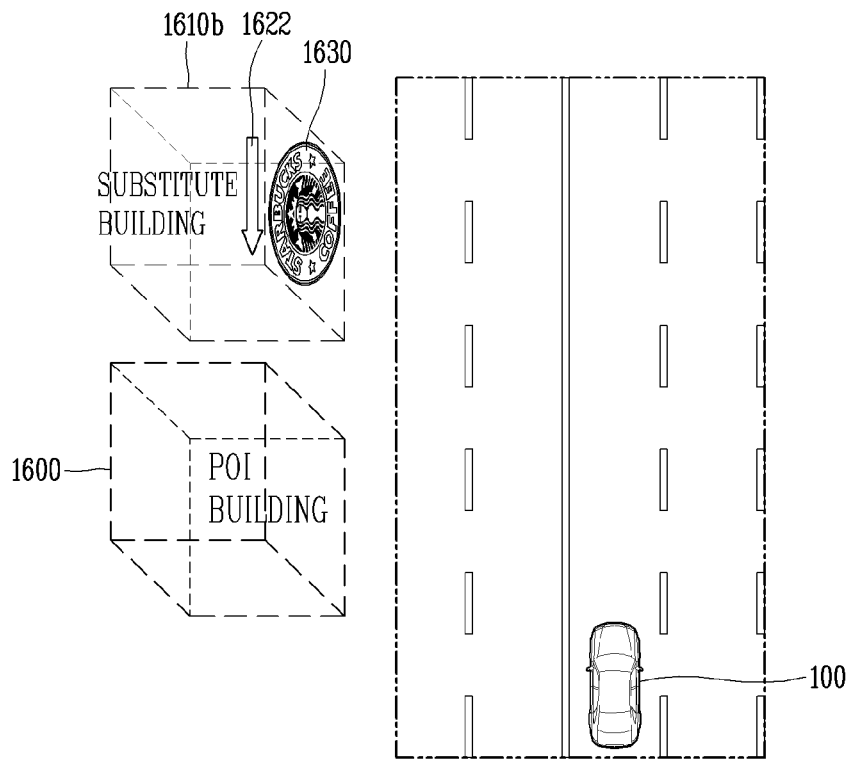
(a)
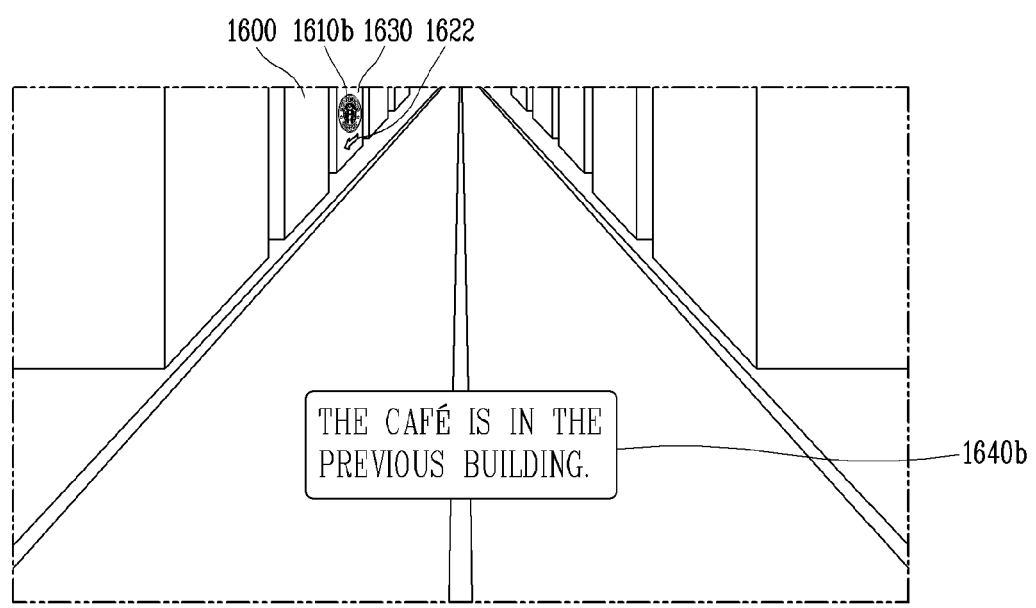
(b)

FIG. 16D
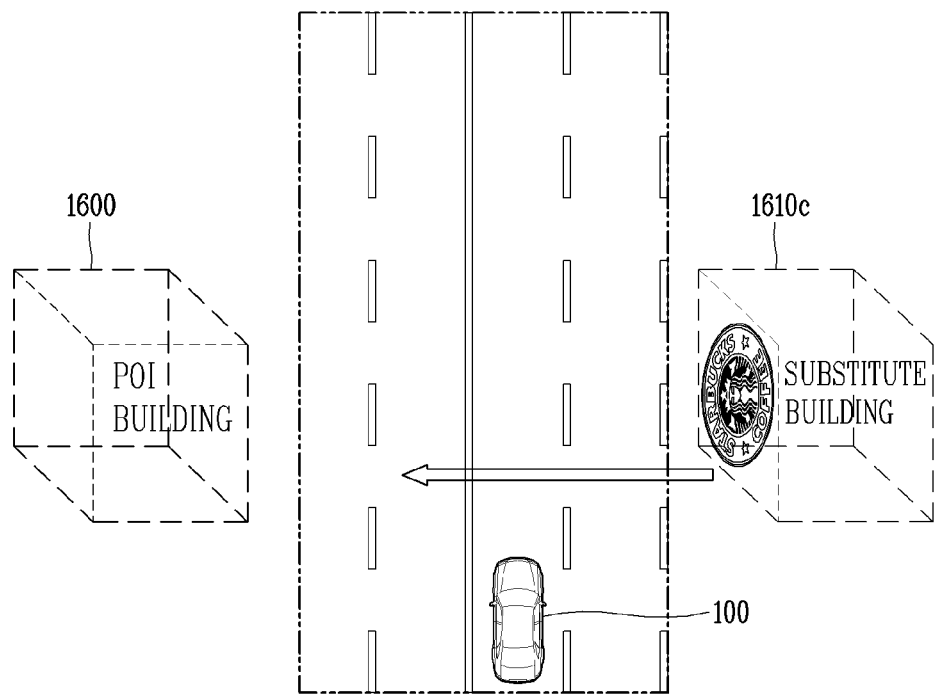
(a)
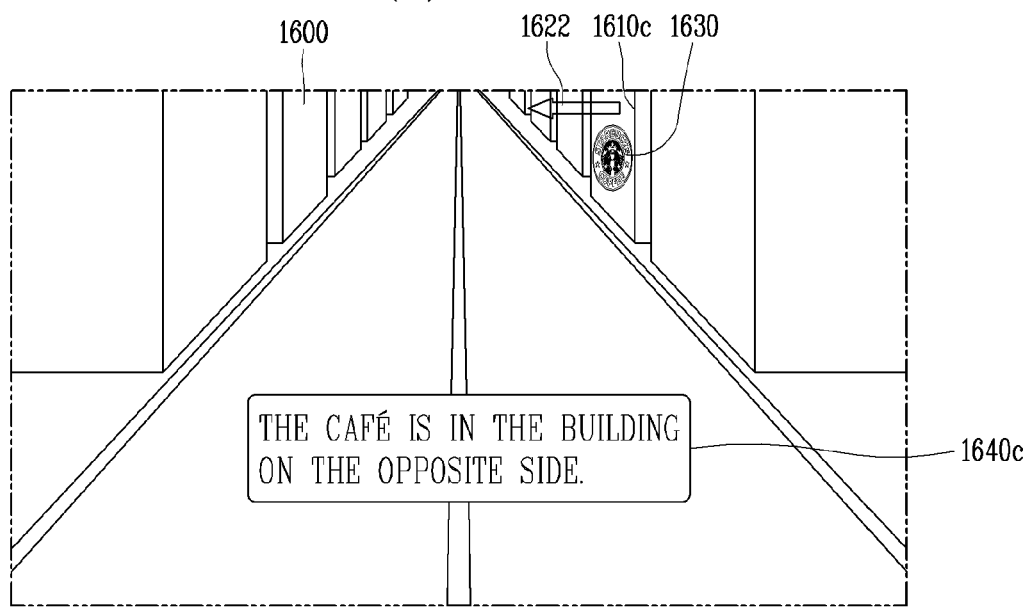
(b)

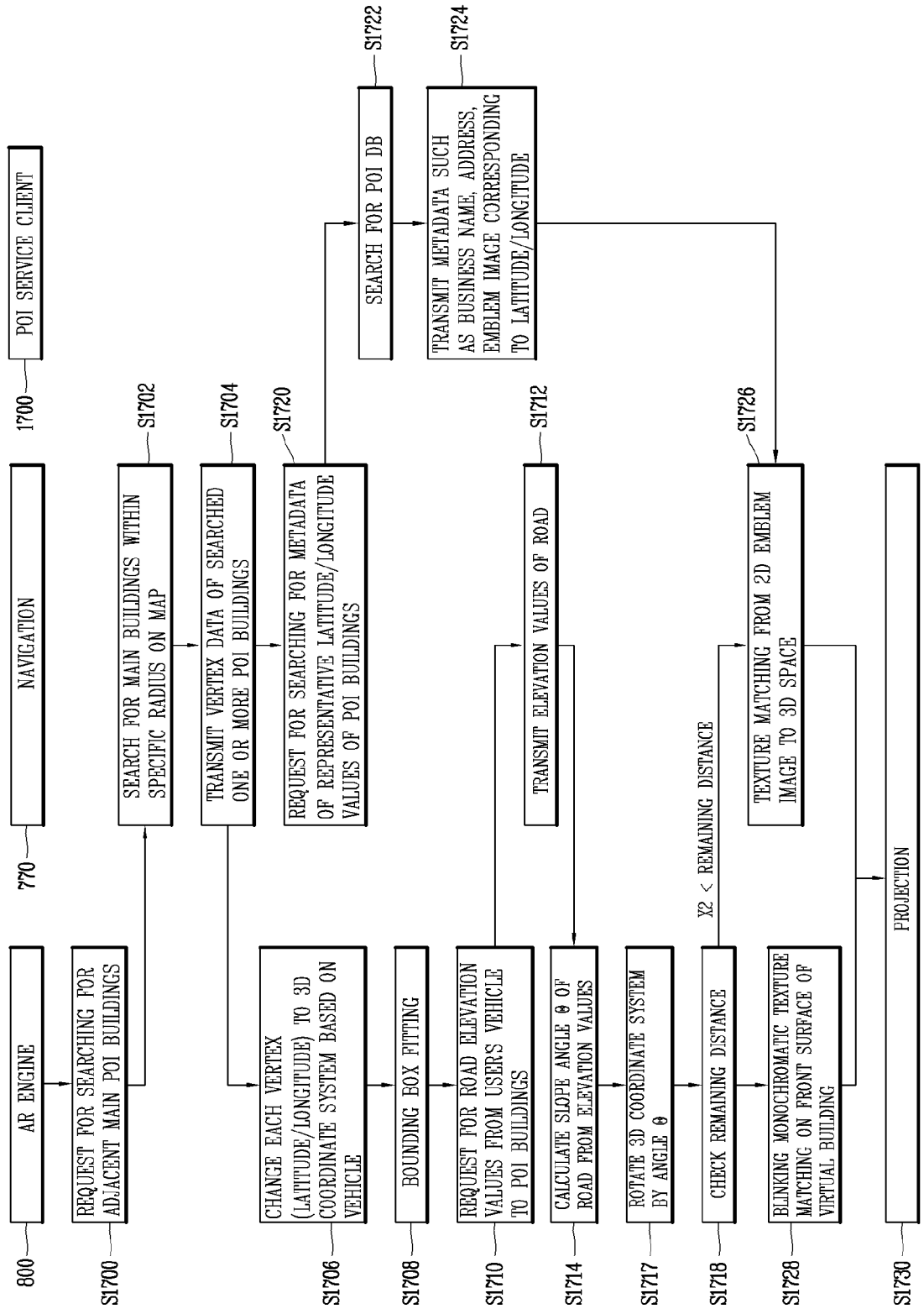

FIG. 22
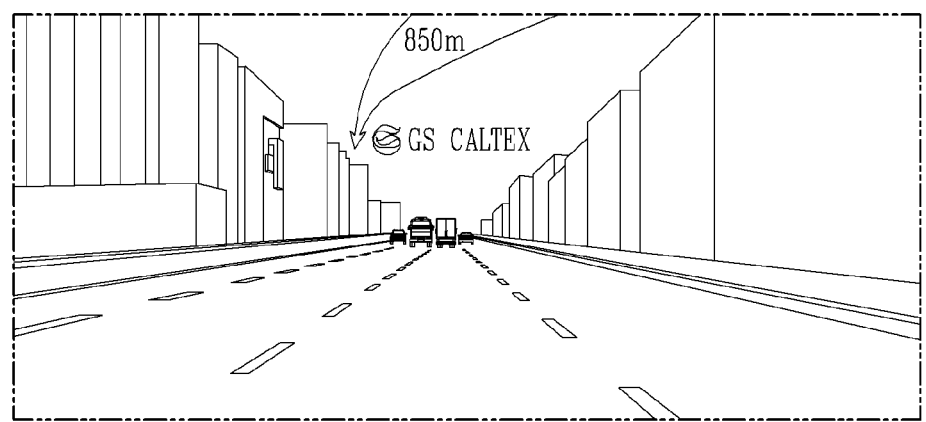
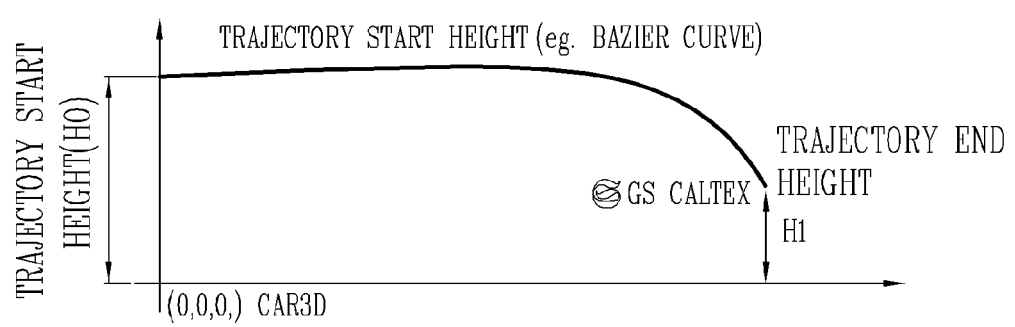
(b)

VEHICLE CONTROL DEVICE AND CONTROL METHOD THEREFOR

CROSS-REFERENCE TO RELATED APPLICATION(S)

This application is the National Stage filing under 35 U.S.C. 371 of International Application No. PCT/KR2020/018170, filed on Dec. 11, 2020, which claims the benefit of U.S. Provisional Application No. 62/949,927 filed Dec. 18, 2019, the contents of which are all incorporated by reference herein in their entirety.

TECHNICAL FIELD

The present disclosure relates to a vehicle control device and a method for controlling the same.

BACKGROUND ART

A vehicle is an apparatus that moves in a direction desired by a user on board. A representative example of a vehicle may be an automobile.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

DISCLOSURE OF INVENTION

Technical Problem

An implementation of the present disclosure describes an optimized destination highlighting interface in order to solve the above problems.

An implementation of the present disclosure also describes a vehicle control device capable of outputting AR information on a building including a destination in an optimized manner.

The tasks to be solved in the present disclosure may not be limited to the aforementioned, and other problems to be solved by the present disclosure will be obviously understood by a person skilled in the art based on the following description.

Solution to Problem

In order to achieve those aspects and other advantages, there is provided a vehicle control device that may include an interface unit connected to a display unit disposed in a vehicle to perform communication, and a processor configured to control a display unit disposed in the vehicle through the interface unit. The processor may receive destination information through the interface unit to obtain spatial coordinates of a building corresponding to the destination information from map information, and control the display unit such that a graphic object related to the destination information is displayed to be overlaid on the building based on the spatial coordinates of the building corresponding to the destination information.

In an implementation, the processor may render a solid figure including the building using the spatial coordinates of the building, and control the display unit such that the graphic object related to the destination information is output on at least one of a plurality of surfaces defining the solid figure.

In an implementation, the processor may determine an adjacent building of the building corresponding to the destination information when the spatial coordinates of the building corresponding to the destination information do not exist in the map information, and render the solid figure including the building corresponding to the destination information based on spatial coordinates of the adjacent building.

In an implementation, the processor may determine an angle between a traveling direction of the vehicle and the solid figure including the building based on a current location of the vehicle and the spatial coordinates of the building, and then determine the number of surfaces, on which the graphic object related to the destination information is to be output on the solid figure, based on the determined angle.

In an implementation, the processor may control the display unit to output the graphic object to any one of the plurality of surfaces of the solid figure when the determined angle is a first angle smaller than a preset angle, and control the display unit to output the graphic object to at least two of the plurality of surfaces of the solid figure when the determined angle is a second angle greater than the preset angle.

In an implementation, the processor may increase the number of outputs of the graphic object, based on a change in angle from the first angle to the second angle as the vehicle travels.

In an implementation, the one surface may vary depending on whether another building exists between the building and the vehicle.

In an implementation, the processor may determine a slope of a road, on which the vehicle is traveling, from the map information, and match the solid figure with the building corresponding to the destination information by tilting the solid figure to correspond to the determined slope.

In an implementation, the processor may control the display unit to output the graphic object related to the destination information based on the solid figure tilted to correspond to the slope.

In an implementation, the interface unit may be connected to a camera disposed in the vehicle to perform communication with the camera, and the processor may receive an image from the camera disposed in the vehicle, detect edge components for a building region from the received image, and use the edge components to match the solid figure including the building with the destination information.

In an implementation, the processor may control the display unit so that the graphic object related to the destination information is output with being spaced apart from a ground by a predetermined distance.

In an implementation, the processor may change the predetermined distance such that the graphic object does not overlap an adjacent building when the adjacent building exists in the vicinity of the building corresponding to the destination information and the graphic object and the adjacent building overlap each other.

In an implementation, the processor may output the graphic object in a different size based on a size of at least one surface determined to output the graphic object thereon.

In an implementation, the processor may change a display position, at which the graphic object is to be output, based on movement of the vehicle when a width of a surface on which the graphic object is determined to be output is greater than a width of the graphic object.

In an implementation, the processor may change the display position of the graphic object along a traveling direction of the vehicle so that a distance between the vehicle and the graphic object is kept constant when the vehicle enters within a preset distance based on the solid figure.

In an implementation, when the graphic object reaches a boundary line of a region in which the graphic object is set to be output on the determined surface, the processor may maintain the state in which the graphic object has reached the boundary line even if the distance between the vehicle and the graphic object decreases.

In an implementation, the processor may control the display unit to output a pre-generated solid figure in the vicinity of the building corresponding to the destination information and to output the graphic object on the pre-generated solid figure when the spatial coordinates of the building corresponding to the destination information and spatial coordinates of the adjacent building do not exist in the map information.

A method for controlling a vehicle control device according to another implementation disclosed herein may include receiving destination information, obtaining spatial coordinates of a building corresponding to the destination information from map information, and controlling a display unit such that a graphic object related to the destination information is displayed to be overlaid on the building, based on the spatial coordinates of the building corresponding to the destination information.

In an implementation, the controlling may be configured to render a solid figure including the building by using the spatial coordinates of the building, and control the display unit to output the graphic object related to the destination information on at least one of a plurality of surfaces defining the solid figure.

A vehicle according to another implementation disclosed herein may include a vehicle control device described in this specification.

The details of other implementations are included in the detailed description and drawings.

Advantageous Effects of Invention

According to an implementation of the present disclosure, one or more of the following effects can be achieved.

First, according to the present disclosure, an AR technology that is optimized to provide a user with a graphic object associated with a destination on a building corresponding to the destination can be provided.

Second, according to the present disclosure, a graphic object associated with a destination can be displayed to be overlaid on a building by reflecting a slope of a road, thereby providing a user interface capable of accurately outputting AR information onto a building even on a tilted road.

The effects of the present disclosure are not limited to those effects mentioned above, and other effects not mentioned may be clearly understood by those skilled in the art from the description of the appended claims.

BRIEF DESCRIPTION OF DRAWINGS

FIGS. 11A, 11B, 11C, 11D, 11E, 11F, 11G, and 11H are conceptual views illustrating a method for obtaining coordinates of a building including a destination in accordance with one implementation.

FIGS. 12A, 12B, 12C, 12D, 12E, 12F, 12G, 12H, 12I, and 12J are conceptual views illustrating a method for selecting a surface of a building to display an AR image according to a distance between a vehicle and the building including a destination.

FIGS. 13A, 13B, 13C, 13D, 13E, 13F, and 13G are conceptual views illustrating a method for determining a building corresponding to a destination by using an image received through a camera.

FIGS. 14A, 14B and 14C are conceptual views illustrating a method for outputting an AR image on a building when a vehicle of the present disclosure is traveling on an inclined road.

FIGS. 16A, 16B, 16C, and 16D are conceptual views illustrating a method for outputting an AR image when coordinates of a building including a destination cannot be obtained.

FIG. 17 is a flowchart illustrating a method by which a vehicle control device of the present disclosure outputs an AR image on a building of a destination.

FIGS. 19, 20, 21 and 22 are conceptual views illustrating different examples of outputting an AR image according to a distance between a vehicle and a building including a destination.

MODE FOR THE INVENTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an implementation disclosed herein may be understood as a conception including cars, motorcycles and the like. Hereinafter, the vehicle will be described based on a car.

The vehicle according to the implementation may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
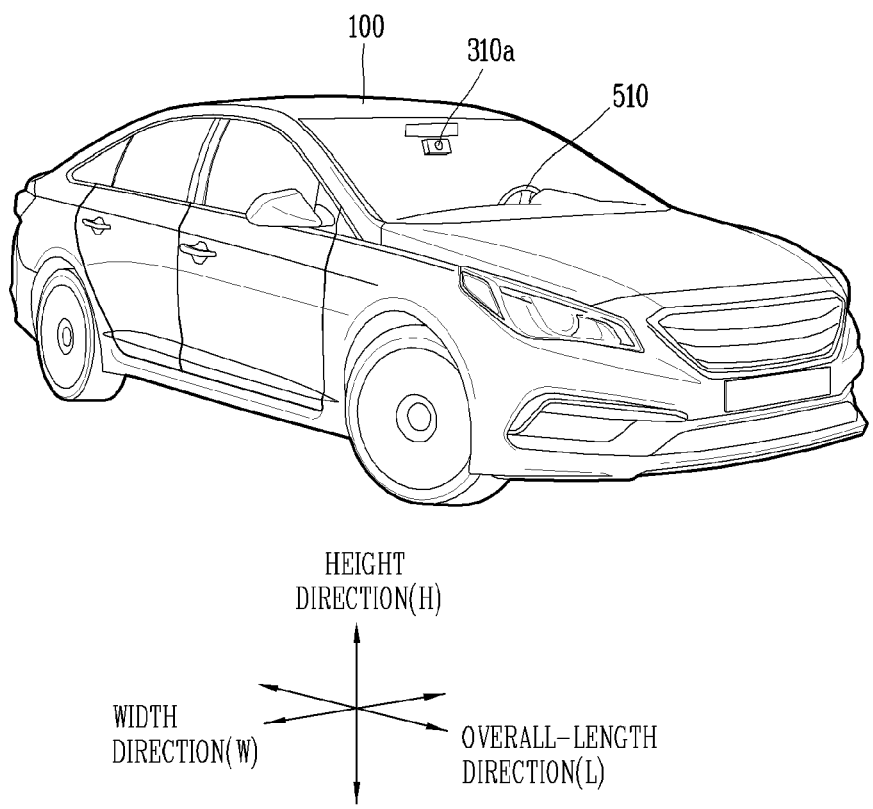
FIG. 1 is a diagram illustrating appearance of a vehicle in accordance with an implementation.

FIG. 1 is a diagram illustrating appearance of a vehicle in accordance with an implementation.

Figure 2:
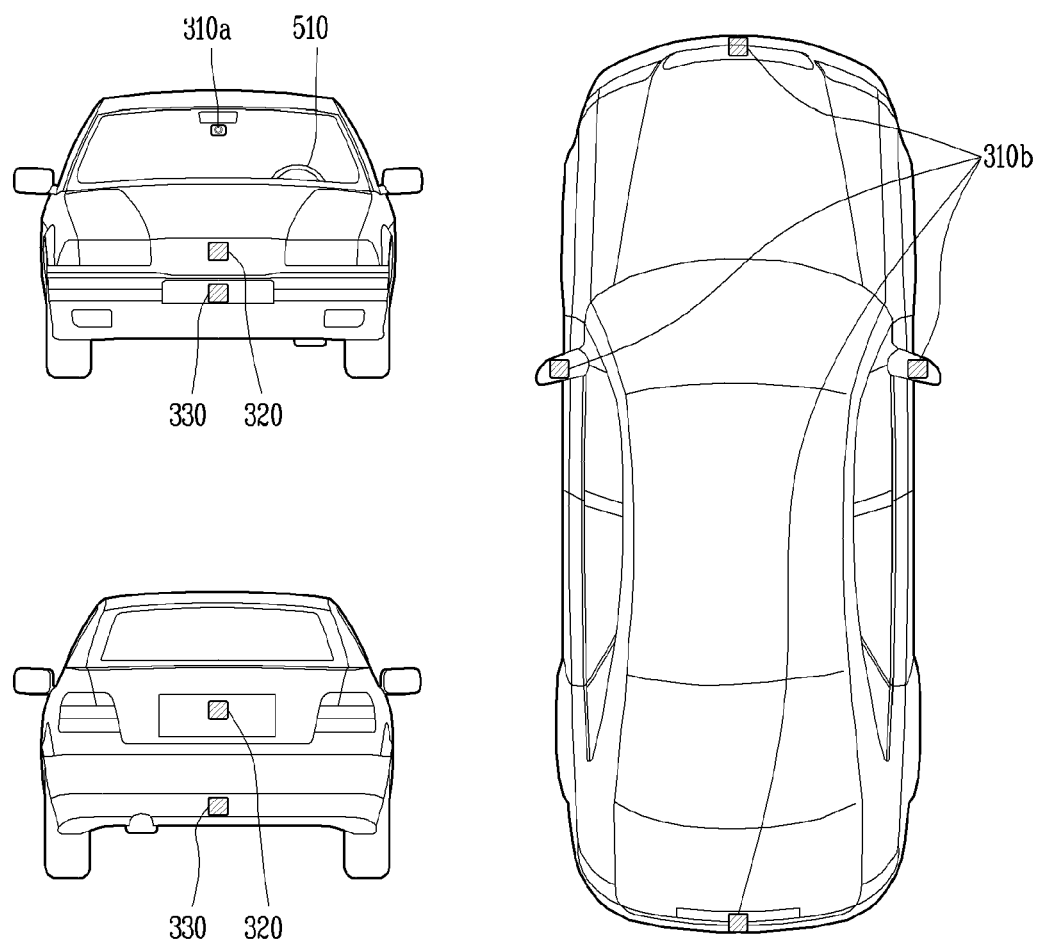
FIG. 2 is a diagram illustrating an outside of the vehicle at various angles in accordance with the implementation.

FIG. 2 is a diagram illustrating an outside of the vehicle at various angles in accordance with the implementation.

Figure 3:
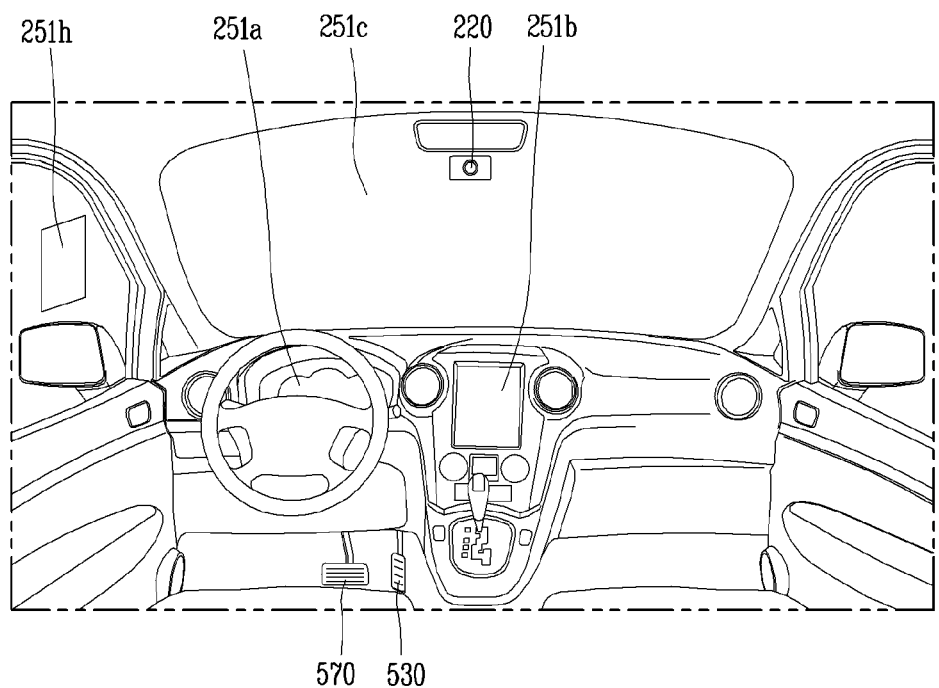
FIGS. 3 and 4 are diagrams illustrating an inside of the vehicle in accordance with the implementation.
Figure 4:
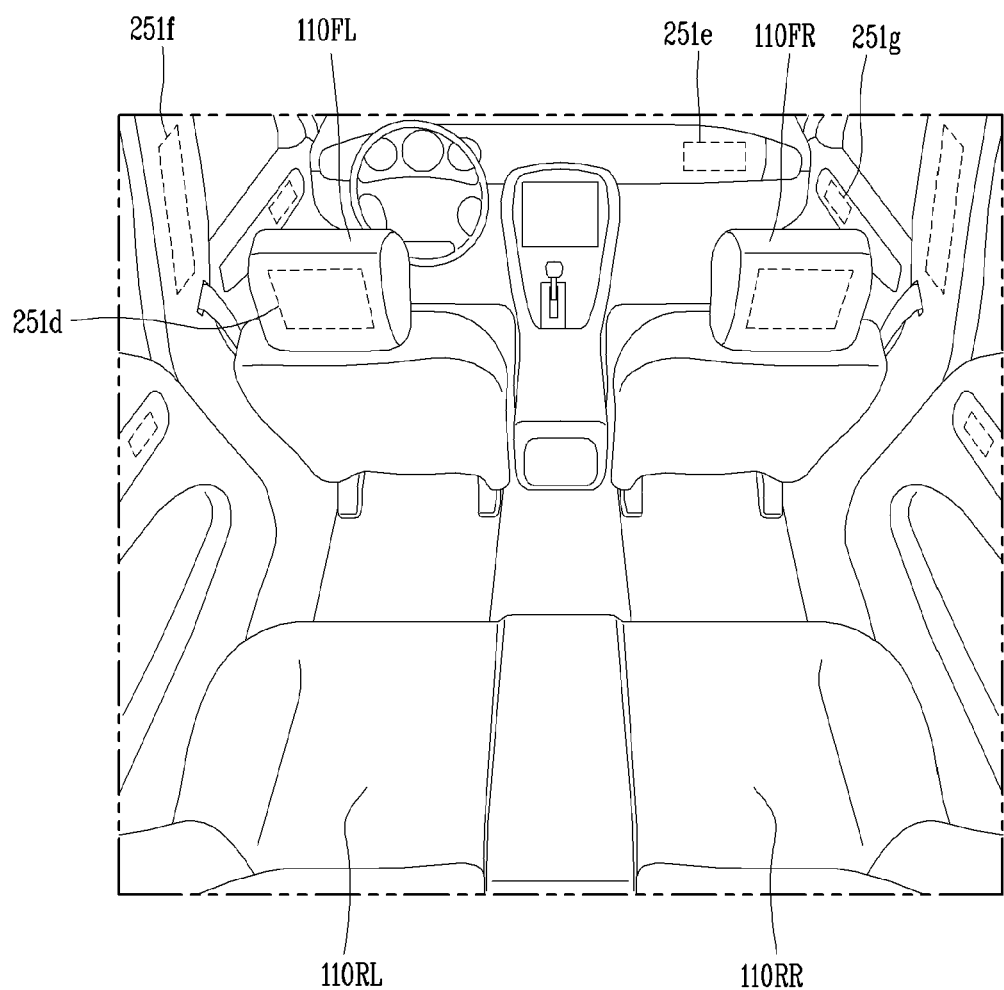

FIGS. 3 and 4 are diagrams illustrating an inside of the vehicle in accordance with the implementation.

Figure 5:
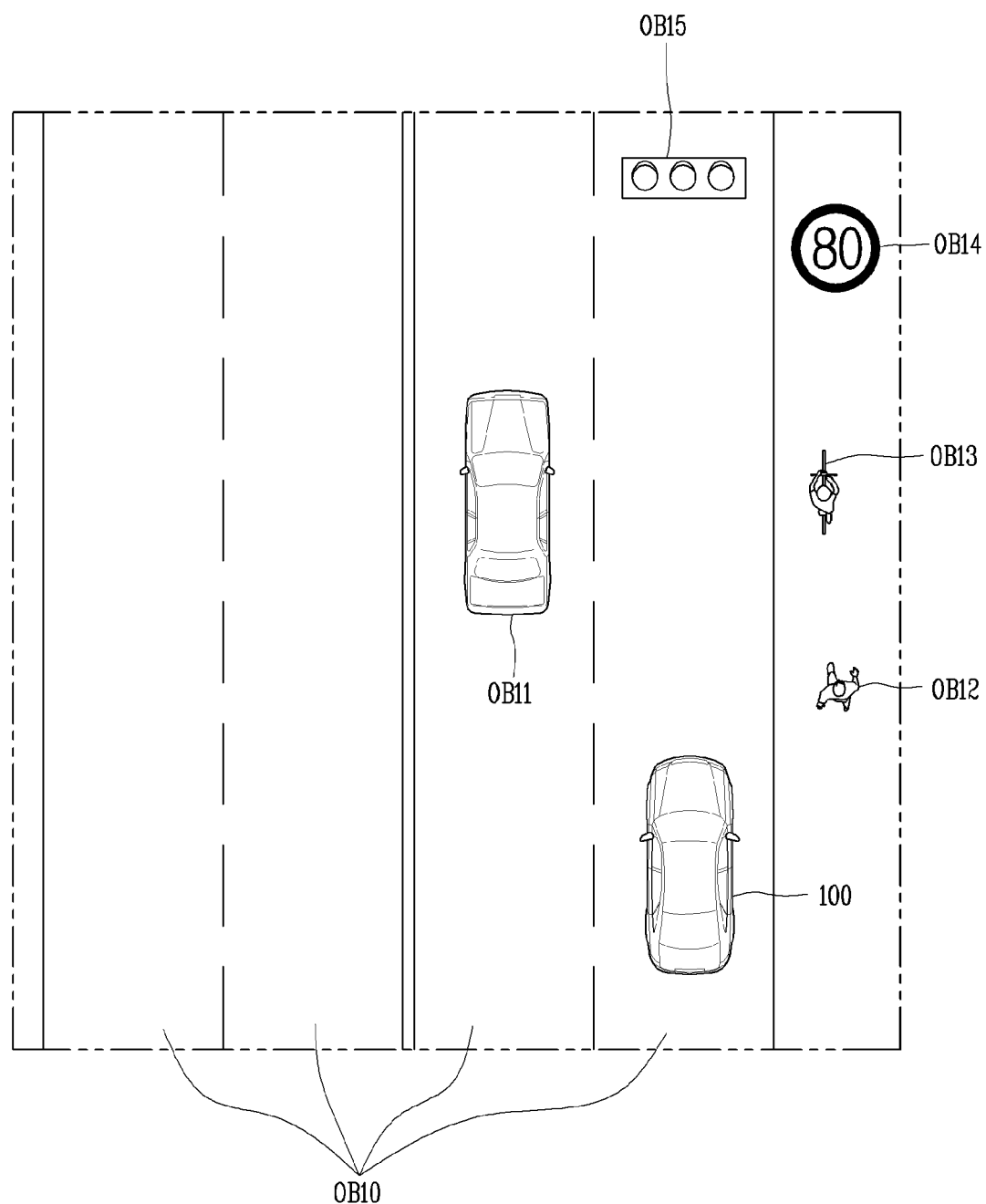
FIGS. 5 and 6 are reference views illustrating objects in accordance with an implementation.
Figure 6:
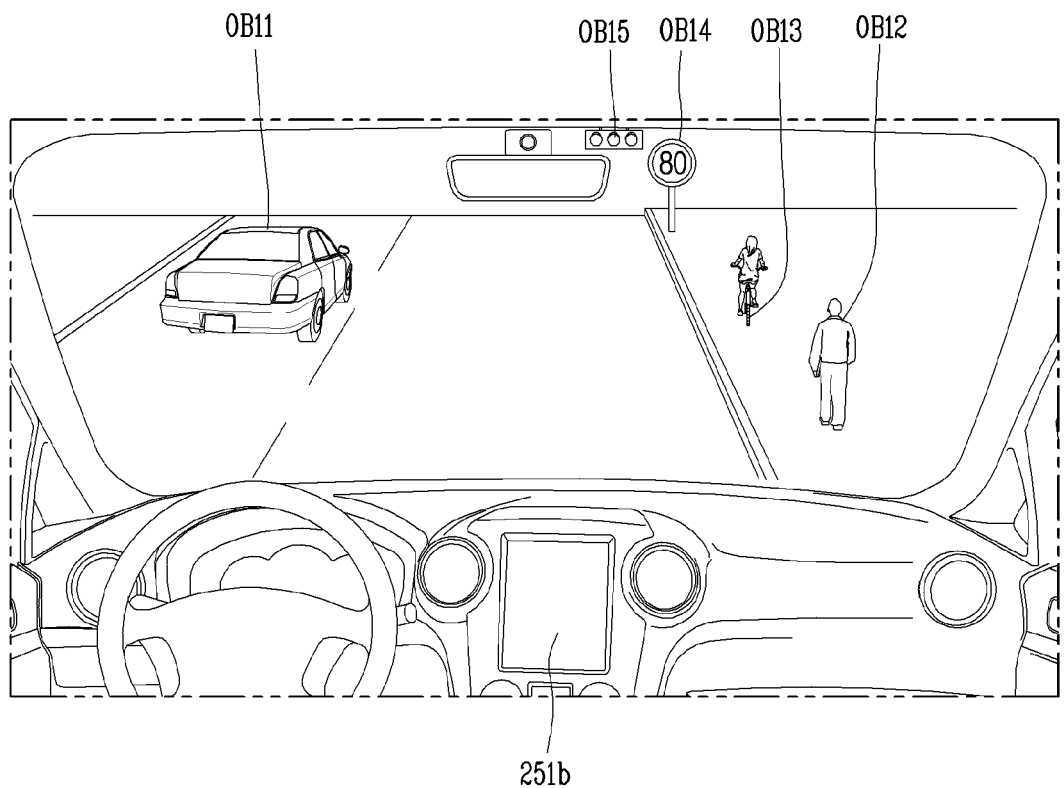

FIGS. 5 and 6 are reference views illustrating objects in accordance with an implementation.

Figure 7:
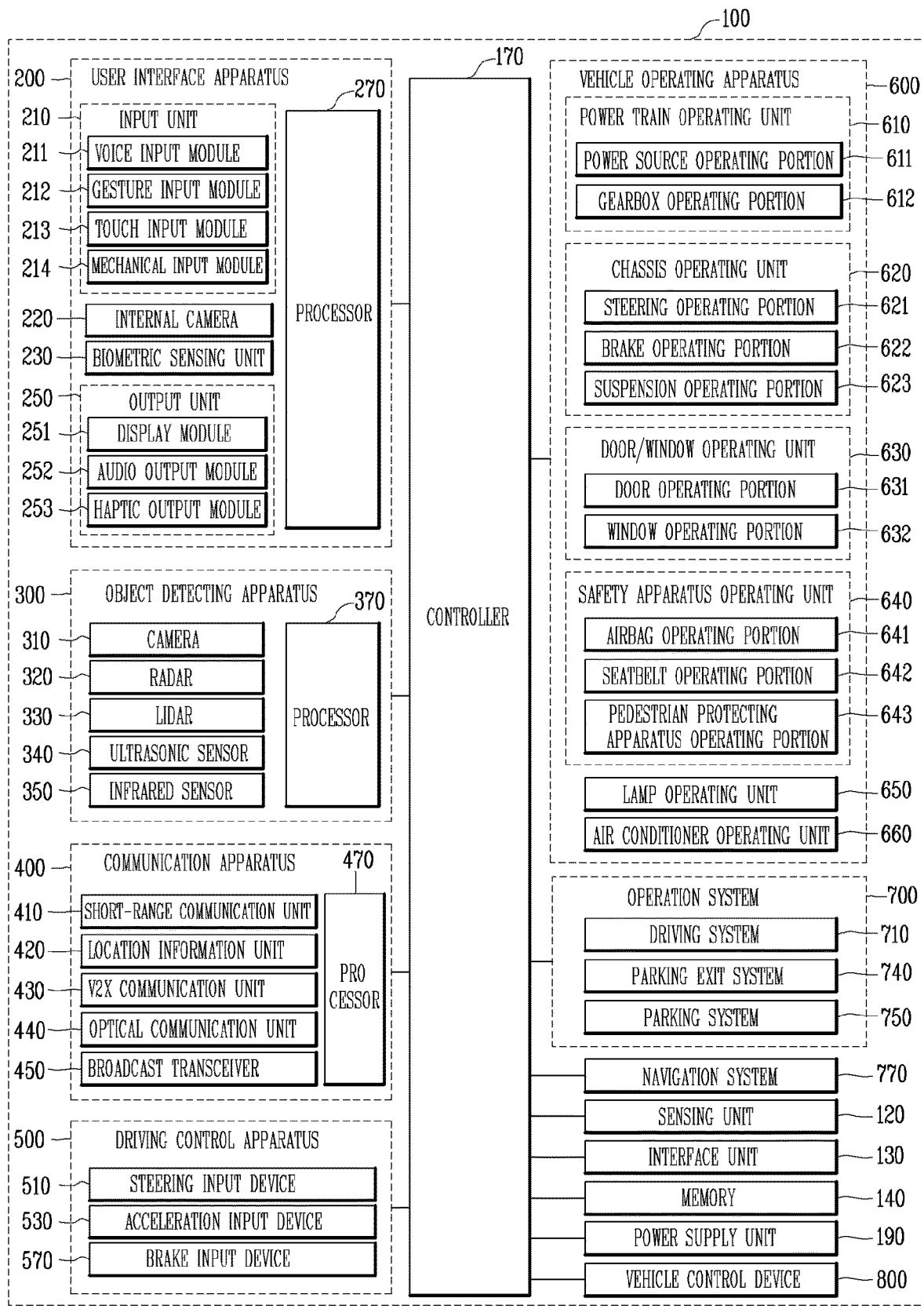
FIG. 7 is a block diagram referenced to describe a vehicle in accordance with an implementation.

FIG. 7 is a block diagram referenced to describe a vehicle in accordance with an implementation of the present disclosure.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

In some implementations, the vehicle 100 may be switched into an autonomous (driving) mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous mode into the manual mode based on driving environment information generated in the object detecting apparatus 300.

In an example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous mode into the manual mode based on information, data or signal provided from an external device.

When the vehicle 100 is driven in the autonomous mode, the vehicle 100 may be driven based on an operation system 700.

For example, the vehicle 100 may be driven based on information, data or signal generated in a driving system 710, a parking exit system 740 and a parking system 750.

When the vehicle 100 is driven in the manual mode, the vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in the example of FIG. 7, according to some implementations, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250, and a processor 270.

In some implementations, the user interface apparatus 200 may further include other components in addition to the components described, or may not include some of the components described.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 210 may include an audio input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method, or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display unit 251, an audio output module 252 and a haptic output module 253.

The display unit 251 may output graphic objects corresponding to various types of information.

The display unit 251 may include at least one of a liquid crystal display (LCD), a thin film transistor-LCD (TFT LCD), an organic light-emitting diode (OLED), a flexible display, a three-dimensional (3D) display and an e-ink display.

The display unit 251 may be inter-layered or integrated with a touch input module 213 to implement a touch screen.

The display unit 251 may be implemented as a head up display (HUD). When the display unit 251 is implemented as the HUD, the display unit 251 may be provided with a projecting module so as to output information through an image which is projected on a windshield or a window.

The display unit 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251a to 251g.

The display unit 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may include another vehicle or a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350 and at least one processor, such as processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

In some implementations, the operation system 700 may further include other components in addition to components to be described, or may not include some of the components to be described.

Meanwhile, the operation system 700 may include a processor. Each unit of the operation system 700 may individually include a processor.

In some implementations, the operation system may be a sub concept of the controller 170 when it is implemented in a software configuration.

Meanwhile, according to implementations, the operation system 700 may be implemented by at least one of the user interface apparatus 200, the object detecting apparatus 300, the communication apparatus 400, the vehicle operating apparatus 600, and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Meanwhile, the vehicle control device 800 described herein may include all kinds of devices capable of controlling the vehicle, and may be, for example, a mobile terminal. When the vehicle control device 800 is a mobile terminal, the mobile terminal and the vehicle 100 may be connected to each other so as to perform communication in a wired/wireless manner. In addition, the mobile terminal may control the vehicle 100 in various ways in a communication-connected state.

When the vehicle control device 800 is a mobile terminal, the processor 870 described herein may be a controller of the mobile terminal.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of the components included in the vehicle control device 800 according to an implementation of the present disclosure with reference to the accompanying drawings.

Figure 8:
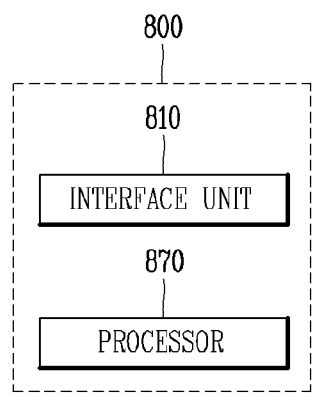
FIG. 8 is a block view illustrating a vehicle control device according to an implementation.

FIG. 8 is a block view illustrating a vehicle control device according to an implementation.

The vehicle control device 800 related to the present disclosure may be configured to control at least one component illustrated in FIG. 7. To this end, the vehicle control device 800 may include an interface unit 810 provided for communication with or control of components included in a vehicle, and a processor 870 for controlling those components included in the vehicle.

The interface unit 810 may, for example, analogously apply the contents of the interface unit 130 described with reference to FIG. 7 in the same/like manner.

For example, the interface unit 810 may serve as a path with the components disposed in the vehicle 100 illustrated in FIG. 7. For example, the interface unit 810 may include a port connectable with the display unit (or display module) 251 of the vehicle, and may be connected to the display unit 251 of the vehicle through the port. In this instance, the interface unit 810 may exchange data with the display unit 251 of the vehicle.

Meanwhile, the interface unit 810 may serve as a path for supplying electric energy to the vehicle control device 800 connected to the vehicle 100. When the interface unit 130 of the vehicle 100 and the interface unit of the vehicle control device 800 are electrically connected to each other, the vehicle control device 800 may receive electric energy supplied from the power supply unit 190 through the interface unit 810.

The vehicle control device 800 described herein may mean an independent part/device/module that is detachable from the vehicle.

Accordingly, the functions of the vehicle control device 800 described herein may be analogously applied in the same/like manner even if the vehicle is changed, and may be independently performed in response to the vehicle control device 800 being connected to the vehicle through the interface unit regardless of a type of vehicle.

The vehicle control device 800 may include a communication unit 820. The vehicle control device 800 may be wirelessly connected to the vehicle 100, a mobile terminal, and a wireless Internet network through the communication unit.

Also, the vehicle control device 800 may include the interface unit 810 and may have a wired connection to the vehicle 100 and/or the mobile terminal through the interface unit.

The interface unit 810 may be connected to the display unit 251 disposed in the vehicle 100 to perform communication.

The display unit 251 may include a transparent display. The transparent display may be attached to a windshield or window of the vehicle. That is, the display unit 251 may include a windshield and a window. In this specification, the configuration that the processor outputs any information (or a graphic object) to the display unit 251 may include a configuration that the processor outputs the information (or graphic object) to the windshield or the window.

The display unit 251 may be disposed on one region of a steering wheel, one region 251a, 251b, 251e of an instrument panel, one region 251d of a seat, one region 251f of each pillar, one region 251g of a door, one region of a center console, one region of a headlining or one region of a sun visor, or implemented on one region 251c of a windshield or one region 251h of a window.

For example, the display unit 251 may include a cluster, a center information display (CID), a navigation device, a head-up display (HUD), and the like.

The display unit 251 may have an inter-layered structure or an integrated structure with a touch sensor so as to implement a touch screen. The touch screen may function as the user input unit 210 which provides an input interface between the vehicle 100 (or the vehicle control device 800) and the user and simultaneously provide an output interface between the vehicle 100 (or the vehicle control device 800) and the user.

The processor 870 may output various information related to the vehicle to the display unit 251. In addition, the processor 870 may output the information related to the vehicle to a different position of the display unit 251 according to a type of information related to the vehicle.

Also, the processor 870 may output a graphic object to the display unit 251 in a preset manner, based on the location of a destination and a driver's gaze.

Various information output to the display unit 251 will be described later in detail with reference to the accompanying drawings.

The display unit 251 may be a navigation system 770 (or a navigation device). Also, the display unit 251 may include the navigation system 770.

That is, the display unit 251 may refer to a navigation device provided in the vehicle 100. The navigation device may be built in the vehicle 100 from shipment of the vehicle 100 or a navigation device mounted by the user.

The display unit 251 may refer to a navigator for a vehicle, and may be a navigation system that is independent of a navigation system provided by a mobile terminal.

The description of the display unit 251 in this specification may be applied to a navigation system 770, a navigation device, or a navigator for vehicle in the same or similar manner.

The vehicle control device 800 may include a processor 870 that controls the display unit 251 disposed in the vehicle through the interface unit 810.

The processor 870 may control the display unit 251 disposed in the vehicle through the interface unit 810, such that an augmented reality (AR) image (or AR information) is output.

The display unit 251 may output the AR image on the windshield of the vehicle or the window of the vehicle in order to output the AR image on an actual object (structure) of a real world.

To this end, the display unit 251, as described above, may be a transparent display disposed on the windshield or window, or a projector or HUD configured to output information on the windshield or window.

The display unit 251 (or the processor 270 controlling the output unit 250) may determine a driver's gaze and a relative location of a destination through the sensing unit 120 disposed in the vehicle, and detect the driver's gaze at the destination.

The sensing unit 120 may determine a relative location between the vehicle and the destination based on the location of the vehicle and the location of the destination (e.g., a building including the destination).

The sensing unit 120 may detect the gaze (or a gazing direction) of the driver who drives the vehicle 100, for example, through a camera for photographing the inside of the vehicle.

The sensing unit 120 may also detect the driver's gaze at the destination through the display unit 251 (e.g., the windshield) and detect one point of the display unit 251 through which the driver gazes at the destination.

Thereafter, the display unit 251 (or the processor 270 for controlling the output unit 250) may output the AR image to include the one point of the display unit 251 (i.e., the one point of the display unit through which the driver gazes at the destination), so that the user can view the AR image displayed on the destination (e.g., a building corresponding to (including) the destination).

The functions/operations/control methods performed by the display unit 251 and the sensing unit 120 may also be performed by the control of the vehicle control device 800.

In this specification, the configuration that the processor 870 of the vehicle control device 800 controls the display unit 251 provided in the vehicle so that the AR image is displayed to be overlaid on the building including the destination may include the meaning that the AR image is displayed on one point of the display unit (windshield) through which the driver's gaze passes when the driver gazes at the building, so that the AR image is displayed to be overlaid on the building from the driver's perspective.

Figure 9A:
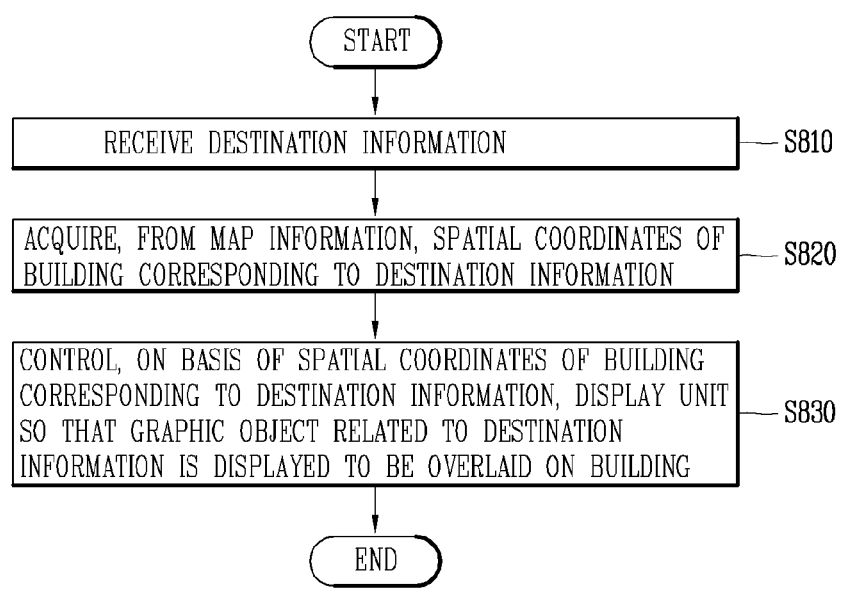
FIG. 9A is a flowchart illustrating a representative control method according to the present disclosure.

FIG. 9A is a flowchart illustrating a representative control method according to the present disclosure.

The processor 870 may receive destination information through the interface unit 810 (S810).

The destination information may be input through the input unit 210 disposed in the vehicle, received through the navigation system 770, or input/received through a mobile terminal communicatively connected to the vehicle 100 or the vehicle control device 800, but the present disclosure may not be limited thereto.

The destination information may be in various types, such as a place, an address, a phone number, a brand name, a business name, and the like.

Thereafter, the processor 870 may obtain spatial coordinates of the building corresponding to the destination information from map information (S820).

Specifically, the processor 870 may acquire (extract, detect) the spatial coordinates of the building corresponding to the destination information from map information, not from an image acquired through a camera.

The building corresponding to the destination information may mean a building in which the destination included in the destination information is located. One building may include at least one destination.

Thereafter, the processor 870 may control the display unit 251 disposed in the vehicle, based on the spatial coordinates of the building corresponding to the destination information, so that a graphic object related to the destination information is displayed to be overlaid on the building (S830).

The graphic object related to the destination information may refer to the AR image described above. For example, the graphic object related to destination information may indicate a trademark or emblem corresponding to the destination information, for example, a business name, trademark, emblem, etc. of a specific brand when the destination is a place managed by the specific brand.

In addition, the object related to the destination information may serve as a signboard for the destination to inform people of the location of the destination.

In this specification, the destination or destination information may refer to a Point of Interest (POI).

In this specification, a destination, destination information, a building corresponding to the destination information, a POI, etc. will be used together, and a graphic object, an emblem, and an AR image related to the destination information will be used together.

In addition, the vehicle control device described in this specification may be called an AR engine in that it outputs a graphic object related to destination information in augmented reality on a building corresponding to the destination information.

Figure 9B:
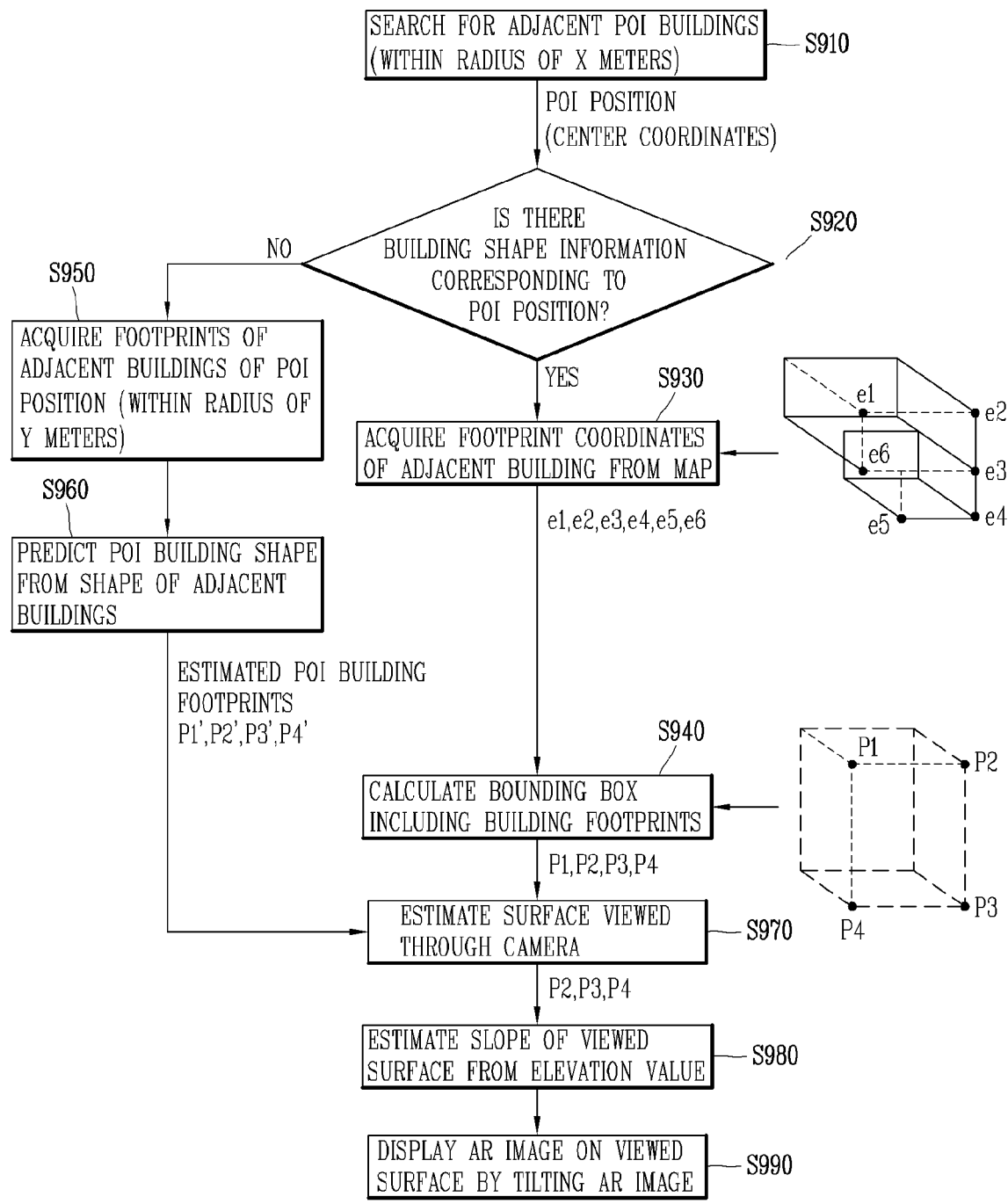
FIG. 9B is a flowchart illustrating a method for controlling an AR image to be displayed on a building in accordance with one implementation.

FIG. 9B is a flowchart illustrating a method for controlling an AR image to be displayed on a building in accordance with one implementation.

The processor 870 may render a solid figure (or a three-dimensional figure) including a building corresponding to the destination information by using spatial coordinates of the building.

Thereafter, the processor 870 may control the display unit 251 to output a graphic object related to destination information on at least one of a plurality of surfaces defining the solid figure.

The processor 870 may determine (decide) whether the spatial coordinates of the building corresponding to the destination information exist in the map information.

The map information may be stored in a memory (not illustrated) disposed in the vehicle control device 800 or may be stored in the memory 140 disposed in the vehicle.

The map information may include coordinate information related to each place and also include spatial coordinates of a building when the corresponding place is the building.

The map information may include more coordinate information and spatial coordinates as the map is a high-precision map.

On the other hand, when the spatial coordinates of the building corresponding to the destination information do not exist in the map information, the processor 870 may determine an adjacent building to the building corresponding to the destination information, and render a solid figure including the building corresponding to the destination information based on spatial coordinates of the adjacent building.

When the spatial coordinates of the building corresponding to the destination information exist in the map information, the processor 870 may render a solid figure including the building corresponding to the destination information by using the spatial coordinates.

Thereafter, the processor 870 may determine a slope of a road, on which the vehicle is traveling, from the map information. The processor 870 may then match the solid figure with the building corresponding to the destination information by tilting the solid figure to correspond to the determined slope.

Specifically, the processor 870 may control the display unit to output the graphic object related to the destination information based on the solid figure tilted to correspond to the slope.

The description will be given in more detail below.

Referring to FIG. 9B, when the destination information is received, the processor 870 may search for adjacent POI buildings. At this time, the processor 870 may search for the adjacent POI buildings when the vehicle enters within a preset radius from the destination corresponding to the destination information based on the coordinates information included in the destination information.

The processor 870 may determine whether shape information (footprints or spatial coordinates) of a building (adjacent POI building) corresponding to the destination information exists in the map information (S920).

When the shape information is present in the map information, the processor 870 may acquire footprints (i.e., spatial coordinates) (e.g., e1, e2, e3, 34, e5, and e6) of the adjacent building (i.e., the building corresponding to the destination information) from the map information (S930).

Afterwards, the processor 870 may calculate a bounding box (i.e., solid figure) including the footprints of the building, based on the footprints of the building.

The bounding box (solid figure) may be formed to include the building corresponding to the destination information, and may be expressed by predetermined coordinate information (P1, P2, P3, P4). For example, since the figure of the building may be varied, the bounding box (solid figure) may have a hexahedral shape.

On the other hand, when the shape information does not exist in the map information, the processor 870 may acquire the footprints of the adjacent building of the POI position (the position of the destination information) (S950). The adjacent building may refer to a neighboring building existing within a predetermined radius from the corresponding building, rather than the building including the destination information.

Thereafter, the processor 870 may predict a shape of a POI building from the shape of the adjacent building (S960), and render a solid figure including the POI building based on the predicted information.

Additionally, the processor 870 may estimate a surface, which is viewed through a camera, among the coordinates P1, P2, P3, P4 or P1', P2', P3', P4 of the rendered solid figure (S970).

The processor 870 may estimate an inclination of the surface viewed through the camera based on at least one of a slope and an elevation value of a road on which the vehicle is traveling (S980).

The processor 870 may tilt the AR image (i.e., the graphic object related to the destination information) to output the AR image on the viewed surface (S990).

Figure 10:
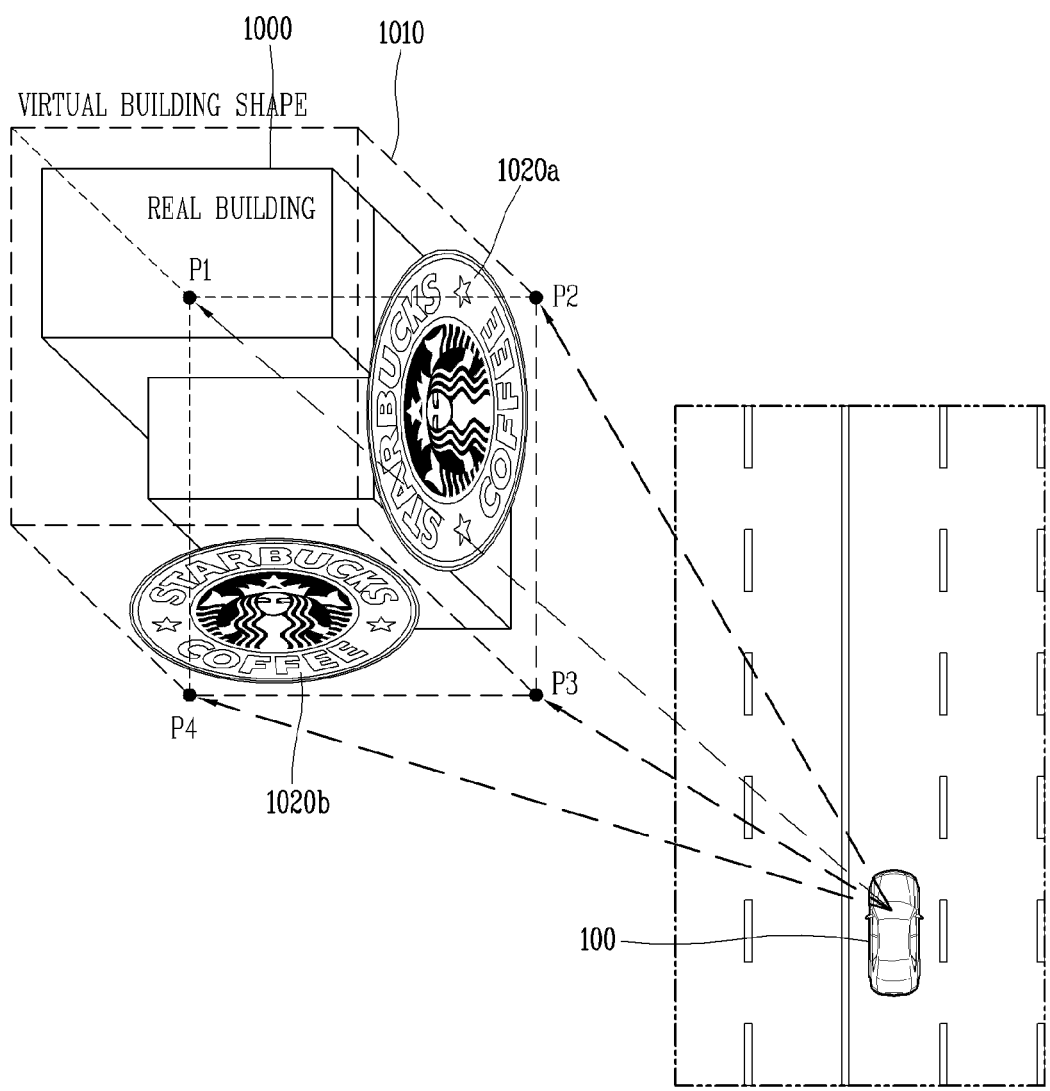
FIG. 10 is a conceptual view illustrating the control method illustrated in FIGS. 9A and 9B.

FIG. 10 is a conceptual view illustrating the control method illustrated in FIGS. 9A and 9B.

Referring to FIG. 10, the processor 870 of the vehicle control device 800 provided in the vehicle 100 may obtain spatial coordinates of a building 1000 corresponding to destination information from map information.

The processor 870 may render a solid FIG. 1010 including the building 1000 by using the obtained spatial coordinates of the building 1000 corresponding to the destination information.

Thereafter, the processor 870 may control the display unit 251 to output a graphic object 1020a, 1020b associated with the destination information on at least one of a plurality of surfaces defining the solid FIG. 1010.

FIG. 10 illustrates that the graphic object 1020a, 1020b associated with the destination information is output (irradiated) from the vehicle to the building 1010, but it should be noted that the graphic object associated with the destination information is not directly irradiated to the building.

In the vehicle control device, it should be understood that the graphic object 1020a, 1020b associated with the destination information is output on the display unit 251 (e.g., the windshield or window) disposed in the vehicle using an AR technology, so as to be viewed with being overlaid on the building 1010.

However, the present disclosure may not be limited thereto. When the display unit provided in the vehicle is a projector, the configuration of outputting a graphic object to be overlaid on a building as described herein may also include a configuration of outputting the graphic object directly on the building.

Hereinafter, a description will be given, with reference to the accompanying drawings, of a method for estimating spatial coordinates of a building corresponding to destination information using an adjacent building when the spatial coordinates of the building do not exist in map information.

FIGS. 11A, 11B, 11C, 11D, 11E, 11F, 11G, and 11H are conceptual views illustrating a method for obtaining coordinates of a building including a destination in accordance with one implementation.

Referring to FIG. 11A, the processor 870 of the vehicle control device 800 may determine an adjacent building of the building corresponding to the destination information when the spatial coordinates of the building corresponding to the destination information do not exist in the map information.

Specifically, when the spatial coordinates (or footprint information) of the building 1100 corresponding to the destination information do not exist in the map information, as illustrated in FIG. 11A, the processor 870 may determine adjacent buildings 1110a and 1110b of the building corresponding to the destination information.

The map information may include center coordinates 1102 of the destination information even if the spatial coordinates of latitude and longitude corresponding to vertices of the building and the number of stories to estimate a height of the building or a height value from the ground) do not exist.

When the spatial coordinates of the building 1100 do not exist, the processor 870 may determine the adjacent buildings 1110a and 1110b of the building 1100 corresponding to the destination information based on the center coordinates 1102 of the destination information.

The adjacent buildings may be called candidate buildings.

The processor 870 may render a solid figure including the building 1100 corresponding to the destination information, based on the spatial coordinates of the adjacent buildings.

To this end, as illustrated in FIG. 11B, the processor 870 may determine bounding boxes (solid FIGS. 1114a and 1114b of the adjacent buildings 1110a and 1110b by using the spatial coordinates (footprint information) of the adjacent buildings 1110a and 1110b.

The bounding box may indicate the largest figure (e.g., a quadrangle, a hexahedron) including the vertices of each building.

Figure 11C:
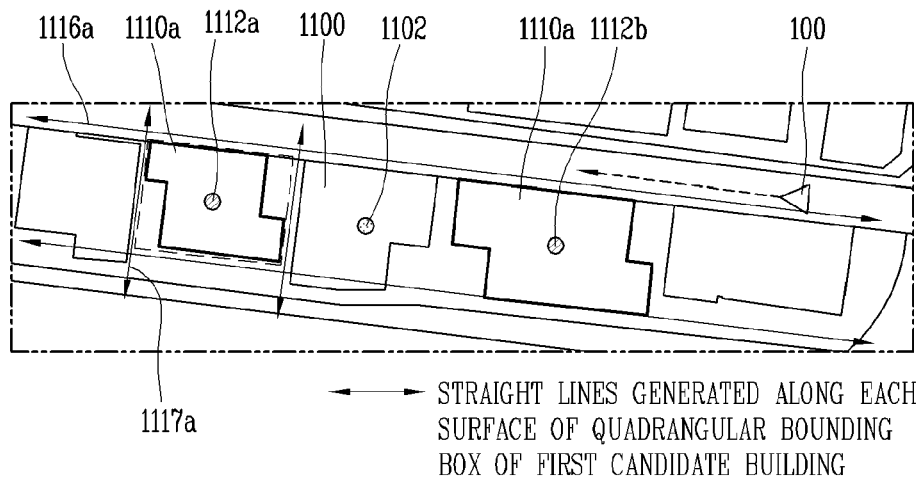
Figure 11D:
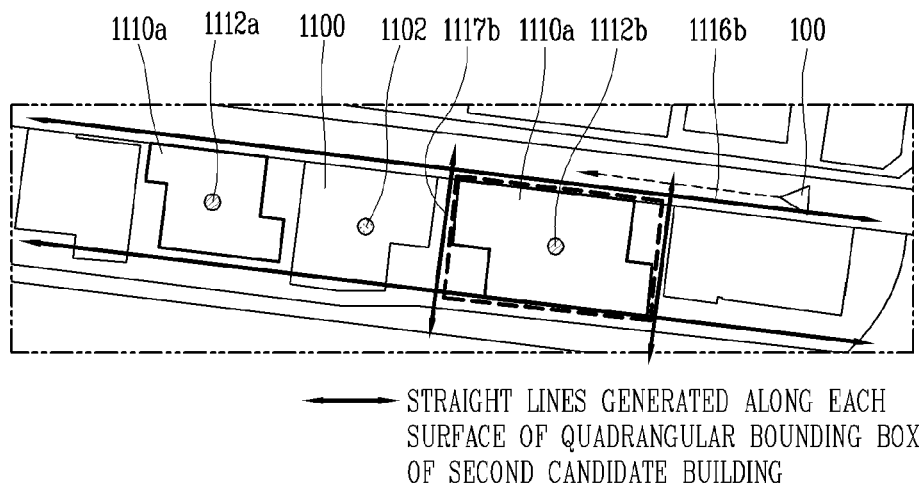

Thereafter, the processor 870 may generate straight lines 1116a and 1117a extending from each surface of the bounding box 1114a of the first adjacent building (the first candidate building) 1110a as illustrated in FIG. 11C, and straight lines 1116b and 1117b extending from each surface of the bounding box 1114b of the second adjacent building (second candidate building) 1110b as illustrated in FIG. 11D.

Figure 11E:
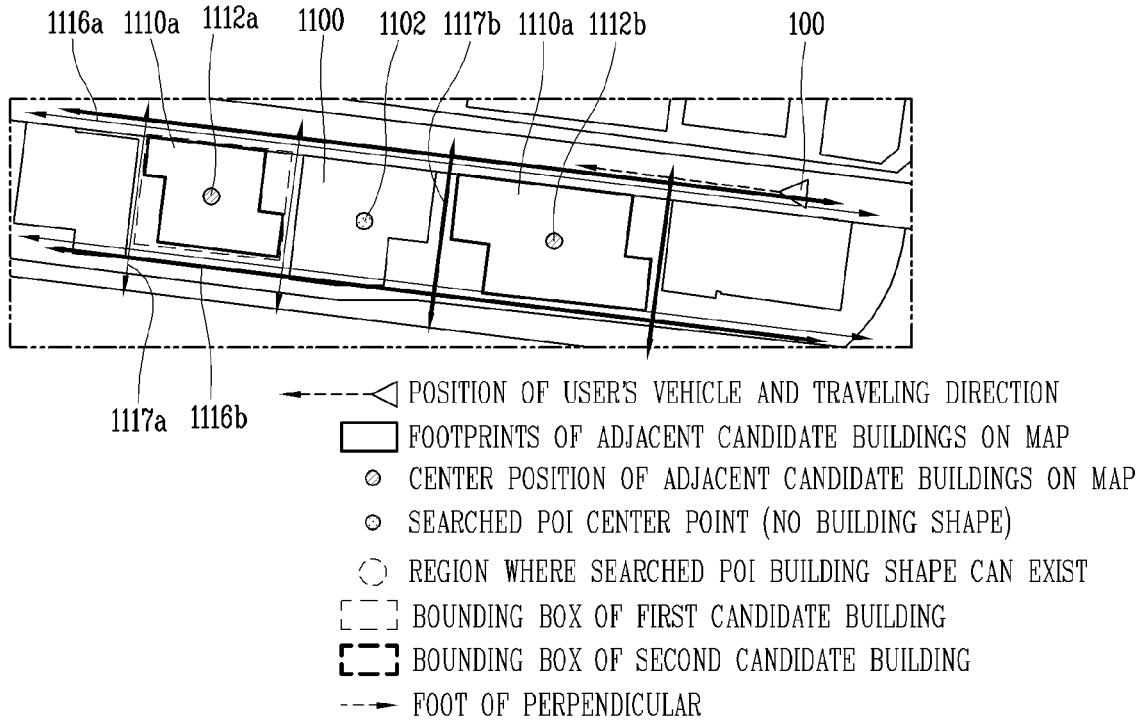
Figure 11F:
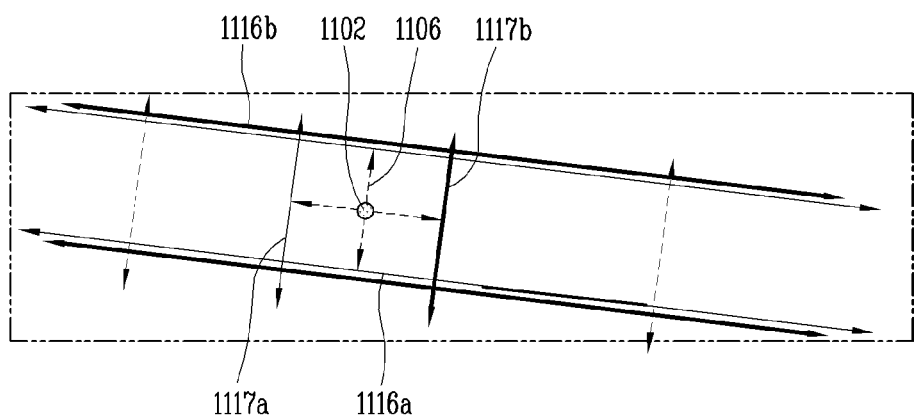

Afterwards, the processor 870, as illustrated in FIGS. 11E and 11F, may determine the straight lines 1116a, 1117a, 1116b, and 1117b generated from all the adjacent buildings adjacent to the building corresponding to the destination information, and draw a foot of perpendicular to the straight lines from the center coordinates 1102 of the destination information, to select a plurality of straight lines to which the foot of perpendicular is drawn from the center coordinates 1102 of the destination information.

Figure 11G:
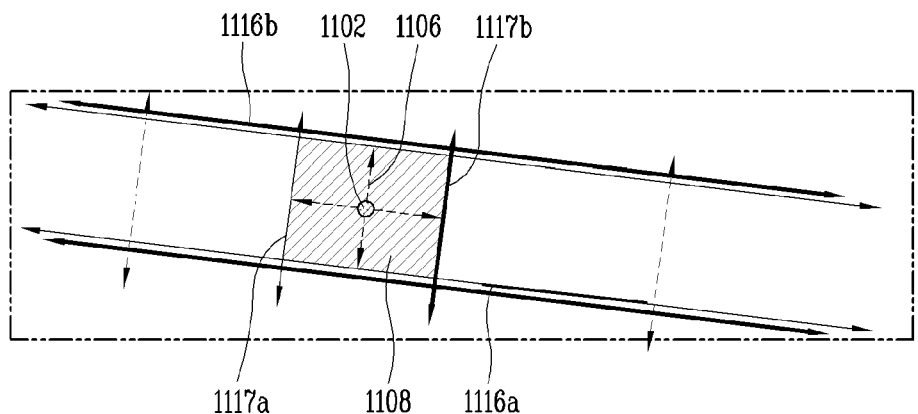

Thereafter, as illustrated in FIG. 11G, the processor 870 may determine a region 1108 with a minimum area defined by the plurality of straight lines to which the foot of perpendicular is drawn, and estimate (define a figure formed by the determined region 1108 as a shape of the building corresponding to the destination information.

Figure 11H:
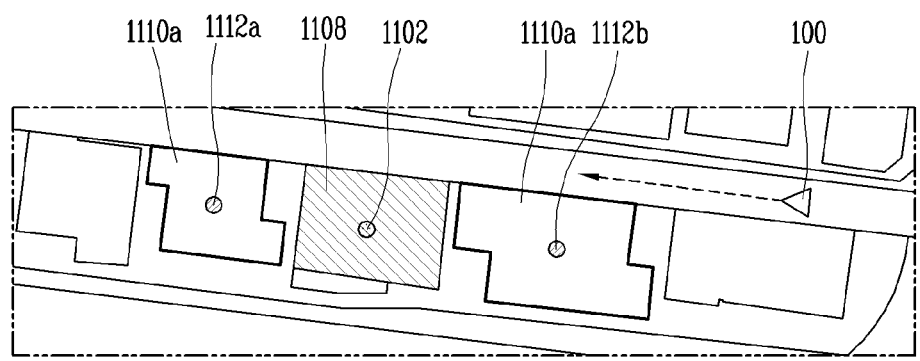

Thereafter, as illustrated in FIG. 11H, the processor 870 may render a solid figure based on the shape of the building corresponding to the destination information estimated by the region 1108.

As described above, a method of estimating a shape of a building (POI building) corresponding to destination information based on spatial coordinates (or footprint information) of adjacent buildings, even if spatial coordinates of the building corresponding to the destination information do not exist in the map information, can be provided.

On the other hand, in the vehicle control device disclosed herein, the number of surfaces of a building on which a graphic object (e.g., emblem) related to destination information is irradiated may be determined according to a distance, angle, direction, and presence or absence of an adjacent building between the vehicle and the building corresponding to the destination information.

FIGS. 12A, 12B, 12C, 12D, 12E, 12F, 12G, 12H, 12I, and 12J are conceptual views illustrating a method for selecting a surface of a building to display an AR image according to a distance between a vehicle and the building including a destination.

The processor 870 may determine an angle between a traveling direction of the vehicle and a solid figure including the building, based on the current location of the vehicle 100 and the spatial coordinates of the building.

Thereafter, the processor 870 may determine the number of surfaces, on which the graphic object related to the destination information is to be output in the solid figure, based on the determined angle.

Specifically, when the determined angle is a first angle smaller than a preset angle, the processor 870 may control the display unit 251 such that the graphic object associated with the destination information is output on any one of a plurality of surfaces of the solid figure including the building.

When the determined angle is a second angle greater than the preset angle, the processor 870 may control the display unit 251 such that the graphic object is output on at least two surfaces of the plurality of surfaces of the solid figure including the building.

The processor 870 may increase the number of outputs of the graphic object, based on a change in angle from the first angle to the second angle as the vehicle travels.

In addition, the one surface may vary depending on whether there is another building between the vehicle and the building corresponding to the destination information.

Referring to FIG. 12A, the processor 870 may calculate straight lines extending from the current position of the vehicle to two vertices existing on both ends of each surface, with respect to the respective surfaces of the solid figure rendered based on the spatial coordinates of the building corresponding to the destination information (or spatial coordinates estimated from adjacent buildings).

The processor 870 may calculate an angle between any one of the two straight lines and the traveling direction of the vehicle. As an example, the processor 870 may determine the number of surfaces on which the graphic object is to be output based on an angle between a straight line up to a vertex close to the vehicle and the traveling direction of the vehicle, of the two angles.

Actually, the number of surfaces may be at least three, and the processor 870 may determine straight lines based on different coordinates located in parallel to the traveling direction of the vehicle, except for coordinates that differ only in height value among the at least three or more coordinates.

For example, the processor 870 may calculate an angle between two straight lines connecting the vehicle and both vertices of a first surface 1200a of the building corresponding to the destination information.

As illustrated in FIG. 12B, the processor 870 may calculate straight lines between the vehicle and both vertices of a second surface 1200b of the building corresponding to the destination information.

Also, as illustrated in FIG. 12C, the processor 870 may calculate straight lines between the vehicle and both vertices of a third surface 1200c of the building corresponding to the destination information.

Thereafter, the processor 870 may determine whether the surface is visible to the user (in other words, visible in a visual field of a camera) based on whether another building (or object) exists between the calculated straight lines and the vehicle.

For example, as illustrated in FIG. 12D, the processor 870 may determine the first surface 1200a to be the surface visible in the visual field of the camera when the adjacent building 1110b does not overlap between the straight lines connecting the vehicle 100 and the first surface 1200a of the building. The surface visible in the visual field of the camera may be determined as a surface on which destination information can be output as an AR image to be overlaid on the building.

Figure 12E:
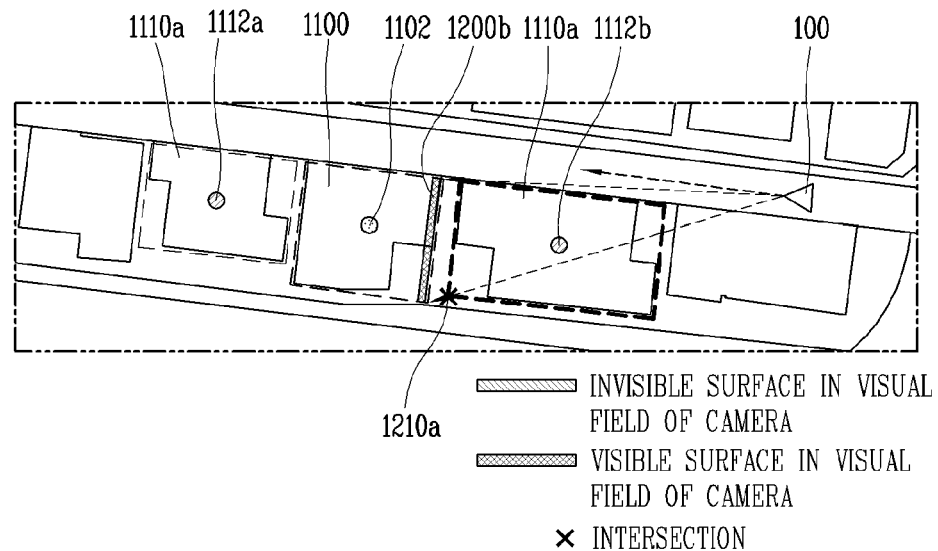
Figure 12F:
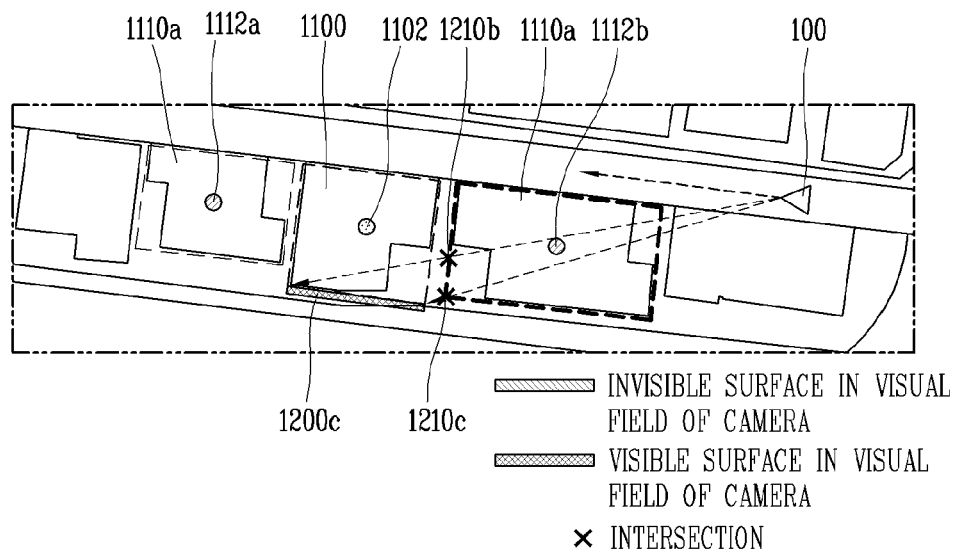

On the other hand, as illustrated in FIGS. 12E and 12F, the processor 870 may determine the second and third surfaces to be hidden surfaces in the visual field of the camera when any one of the straight lines connecting the vehicle 100 and the second surface 1200b of the building has a point 1210a passing through another building 1110b or when the straight line connecting the vehicle 100 and the third surface 1200c of the building has points 1210b and 1210c that overlap the another building 1110b.

The processor 870 may not output the graphic object associated with the destination information on the surface on which the another building overlaps the straight line.

Figure 12G:
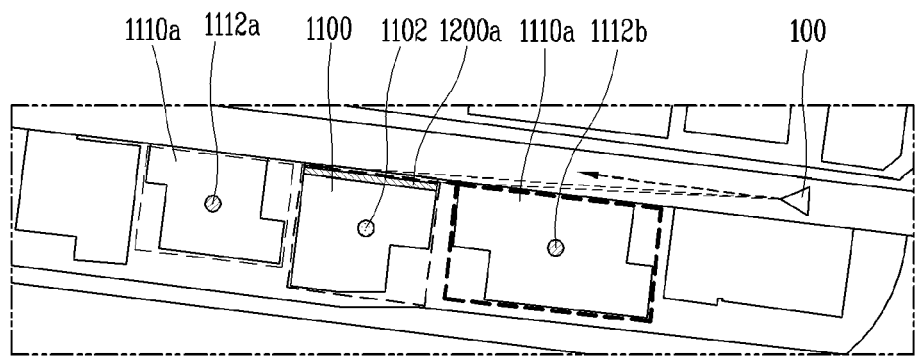
Figure 12H:
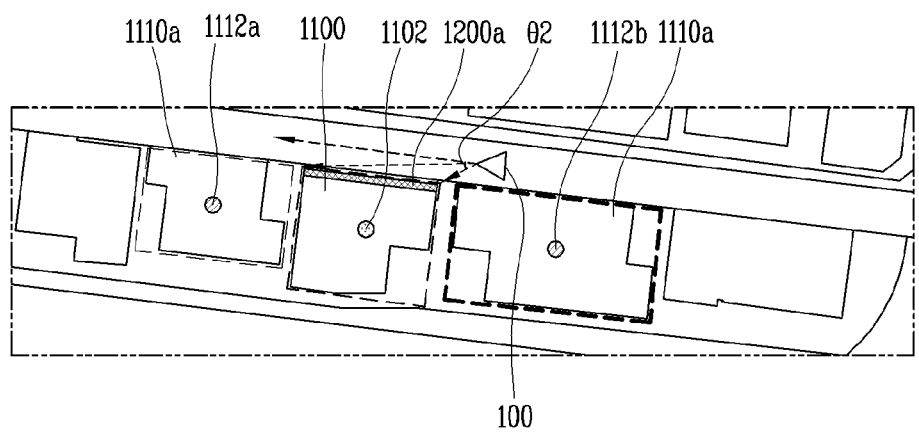

On the other hand, as illustrated in FIGS. 12G and 12H, an angle between the vehicle and the solid figure (specifically, an angle between the traveling direction of the vehicle and a straight line connecting the vehicle and a vertex close to the vehicle among vertices defining the surface 1200a of the solid figure, which is visible in the visual field of the camera) may more increase as the vehicle and the building corresponding to the destination information are closer to each other.

In one example, as illustrated in FIG. 12G, when the angle is a first angle (e.g., 10 degrees) smaller than a preset angle (e.g., 15 degrees) (or when a distance between the vehicle and the building corresponding to the destination information exceeds a predetermined distance), the processor 870 may control the display unit 251 such that the graphic object associated with the destination information is output in augmented reality with being overlaid on any one surface of the solid figure (e.g., the surface 1200a visible in the visual field of the camera).

The one surface may be a surface facing a road on which the vehicle is traveling.

In another example, as illustrated in FIG. 12H, when the angle is a second angle (e.g., 30 degrees) greater than the preset angle (e.g., 15 degrees) (or when the distance between the vehicle and the building corresponding to the destination information is shorter than or equal to the predetermined distance), the processor 870 may control the display unit 251 such that the graphic object associated with the destination information is displayed with being overlaid on at least two surfaces of the solid figure (e.g., the surface 1200a visible through the camera and the surface 1200b facing the vehicle).

As illustrated in FIGS. 12G and 12H, when the angle is changed from the first angle to the second angle by the traveling of the vehicle (that is, the distance between the building and the vehicle is decreased by the traveling of the vehicle), the processor 870 may increase the number of surfaces to output the graphic object.

Figure 12I:
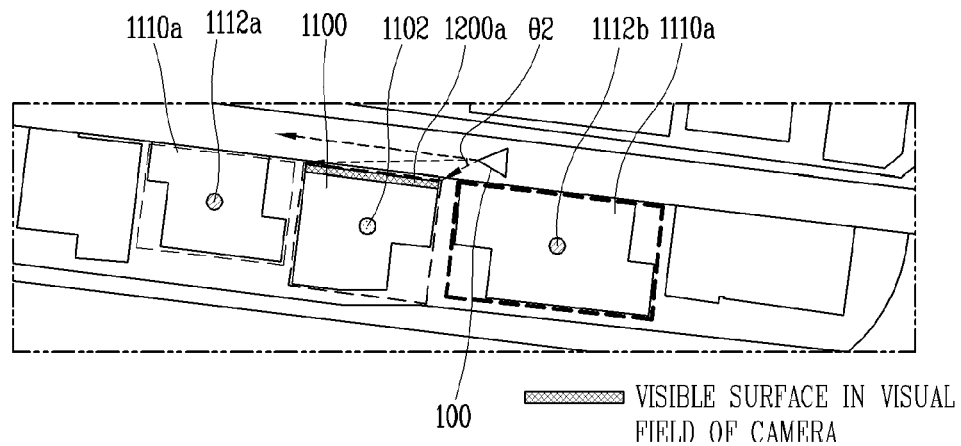
Figure 12J:
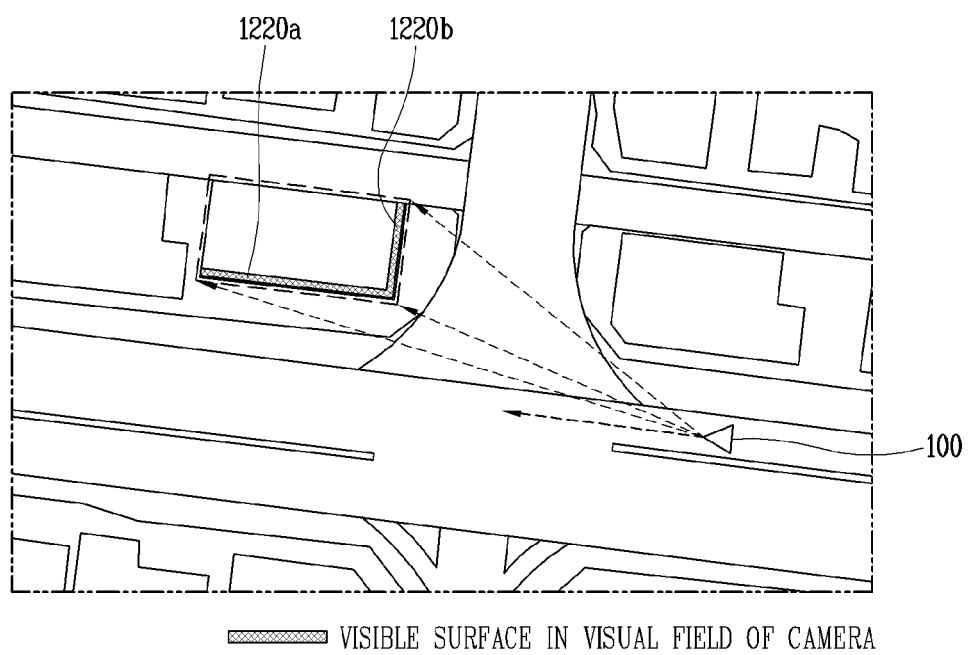

Meanwhile, as illustrated in FIG. 12I, even if the angle is the second angle, when another building exists between the building 1100 and the vehicle 100, the processor 870 may output the graphic object associated with the destination information only on the surface 1200a visible in the visual field of the camera As illustrated in FIG. 12J, when another building does not exist between the building 1100 and the vehicle 100, the processor 870 may output the graphic object associated with the destination information on a plurality of surfaces.

On the other hand, the processor 870 may output the graphic object associated with the destination information in augmented reality to be overlaid on the building by additionally using a camera as well as outputting the graphic object associated with the destination information in augmented reality to be overlaid on the building, on the basis of the spatial coordinates of the building corresponding to the destination information, extracted from the map information.

FIGS. 13A, 13B, 13C, 13D, 13E, 13F, and 13G are conceptual views illustrating a method for determining a building corresponding to a destination by using an image received through a camera.

The interface unit 810 included in the vehicle control device 800 may be connected to the camera disposed in the vehicle 100 to perform communication.

The processor 870 may receive an image from the camera 310 disposed in the vehicle, detect edge components for a building region from the received image, and match a solid figure with the building corresponding to the destination information by using the edge components.

As illustrated in (a) of FIG. 13A, the processor 870 may receive an image (camera image) 1300, which has been processed through the camera 310 disposed in the vehicle, through the interface unit 810.

The processor 870 may recognize (classify, detect) a building object in units of pixels from the received camera image 1300. In this case, the processor 870 may recognize (classify, detect) the building object in units of pixels from the camera image by applying a semantic segmentation technique of general deep learning.

(b) of FIG. 13A illustrates result data 1310 to which the semantic segmentation technique is applied, and the processor 870 may identify the building region using the result data 1310.

Figure 13B:
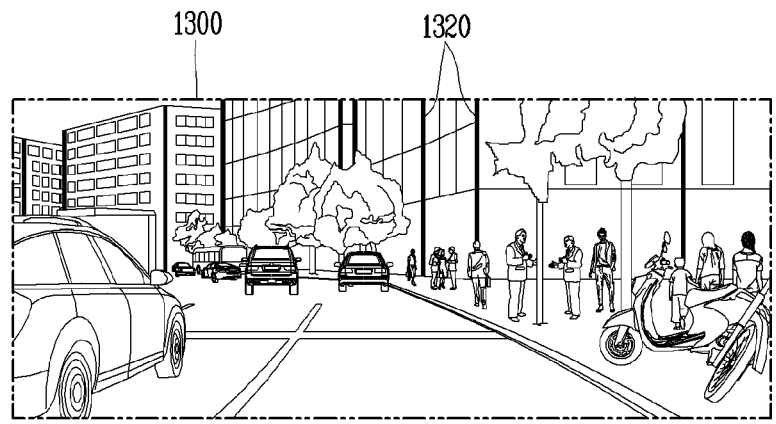

As illustrated in FIG. 13B, the processor 870 may detect edges for the classified building region and extract lines 1320 that satisfy a vertical direction from among the detected edges.

For example, the processor 870 may extract edge lines by applying a line segmentation technique.

Figure 13C:
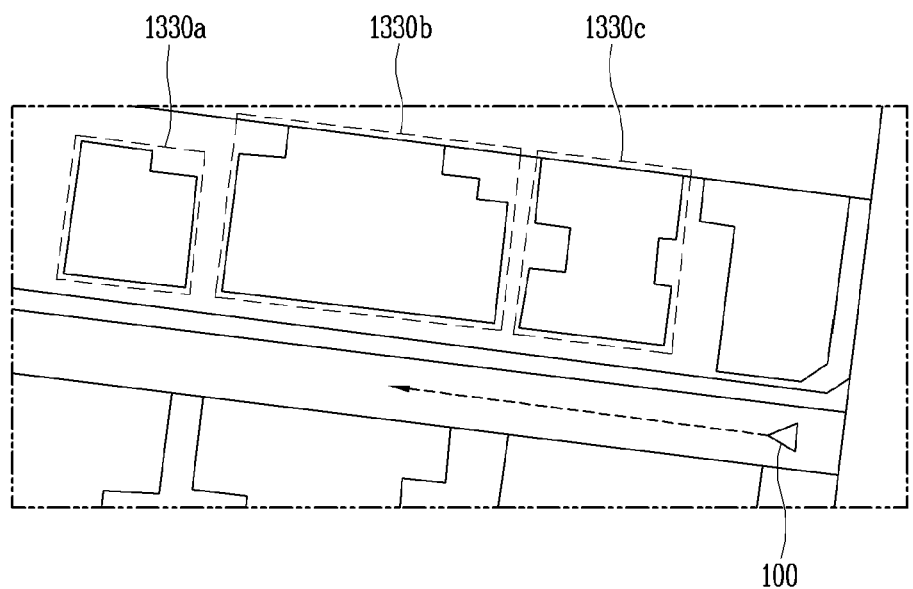

The processor 870, as illustrated in FIG. 13C, may extract (receive) footprint information (spatial coordinates) of every building 1330a, 1330b, and 1330c existing within a specific radius, based on a current position of the vehicle 100, from map information.

Figure 13D:
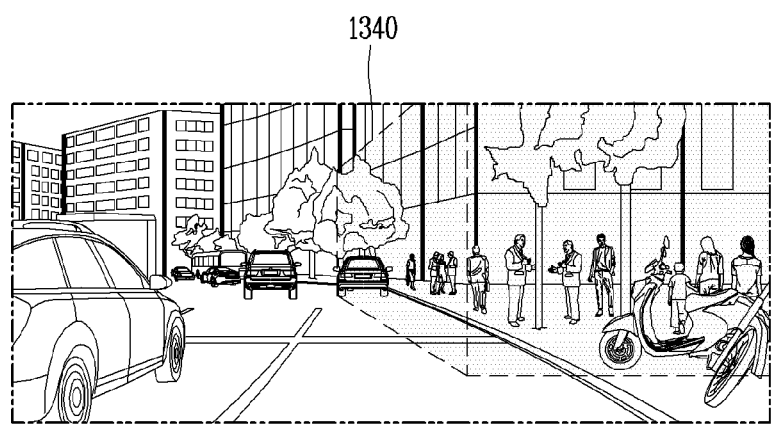

The processor 870 may project the received footprint information of the buildings onto a region of the camera image 1300. In this case, pixels of the buildings within the camera image may not actually match outlines of the buildings, as illustrated in FIG. 13D, due to an error of the current position of the vehicle, an accuracy error of building footprints, etc.

The processor 870, as illustrated in (a) and (b) of FIG. 13E, may determine outermost vertical edges 1350 of the building region 1340 projected on the image 1300, and calculate a disparity value for minimizing a cost function with the vertical edge components 1320 included in the building region of the image 1300.

The condition of the cost function may be designed as follows.

The processor 870 may design the condition of the cost function to include at least one of a disparity value in which the vertical edge lines 1320 are included most in the building region, a disparity value in which a pixel distance between the outermost vertical edge 1350 of the building and the vertical edge lines 1320 included in the building region, or a disparity value in which label pixels of the building corresponding to a result of the building recognition ((b) of FIG. 13E) are included most in the building region.

Figure 13F:
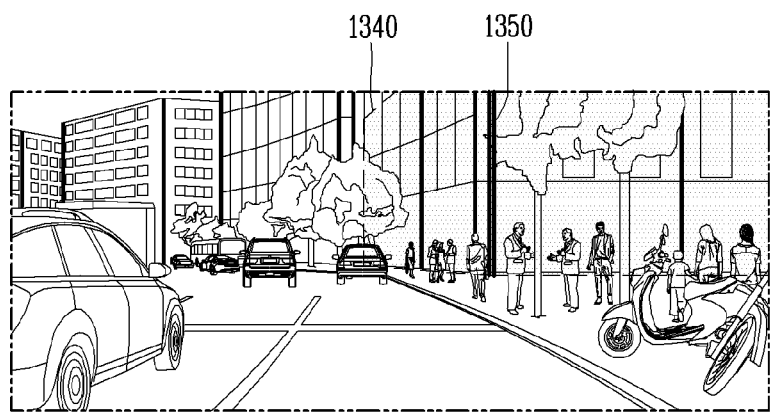

Thereafter, as illustrated in FIG. 13F, the processor 870 may remove a matching error due to a position error by translating coordinates of a pixel vertex of a building (i.e., coordinates of the solid figure including the building) on the image 1300n by the disparity value calculated based on one of the conditions.

Thereafter, as illustrated in (a) of FIG. 13G, after matching the solid figure for the building with the building of the image by removing the matching error from the image 1300, the processor 870 may calculate the number of building pixel labels recognized on each surface 1340a and 1340b. When the number of building pixel labels calculated for each surface is smaller than or equal to a specific threshold value, the processor 870 may determine that the surface is an invisible side.

For example, the processor 870, as illustrated in (b) of FIG. 13G, may define the first surface 1340a as a visible surface, and the second surface 1340b as an invisible surface because the number of building recognition pixel labels is smaller than or equal to the specific threshold value.

The processor 870 may control the display unit 251 to output the graphic object associated with the destination information in augmented reality by being overlaid on the surface defined as the visible surface without outputting the graphic object on the invisible surface.

Meanwhile, the vehicle control device disclosed herein may provide a method for outputting a graphic object associated with destination information to be overlaid on a building in an optimized manner, even when the building corresponding to the destination information is tilted based on the vehicle because a road on which the vehicle travels is tilted.

Figure 14A:
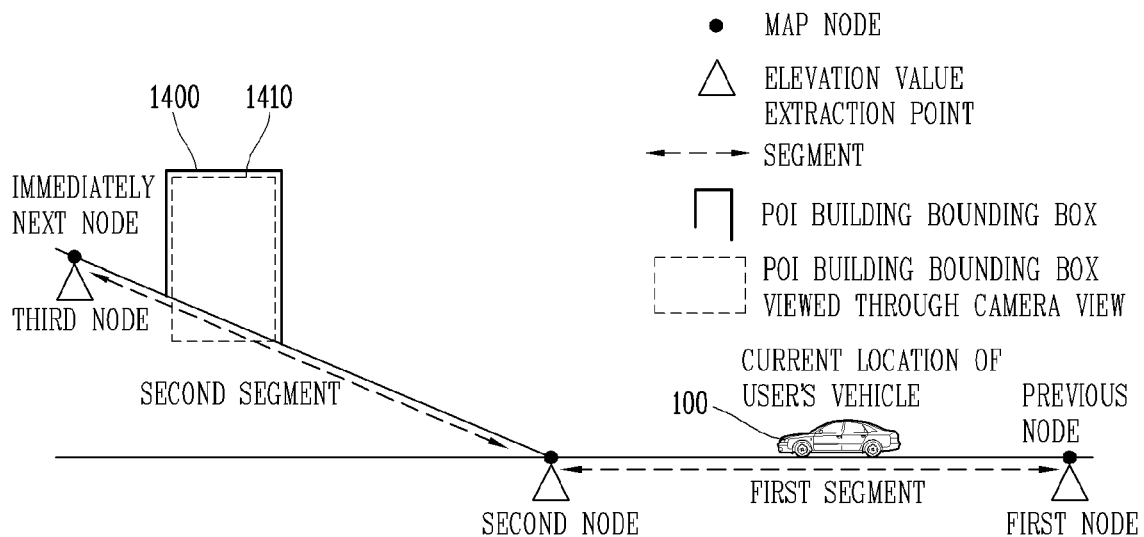
Figure 14B:
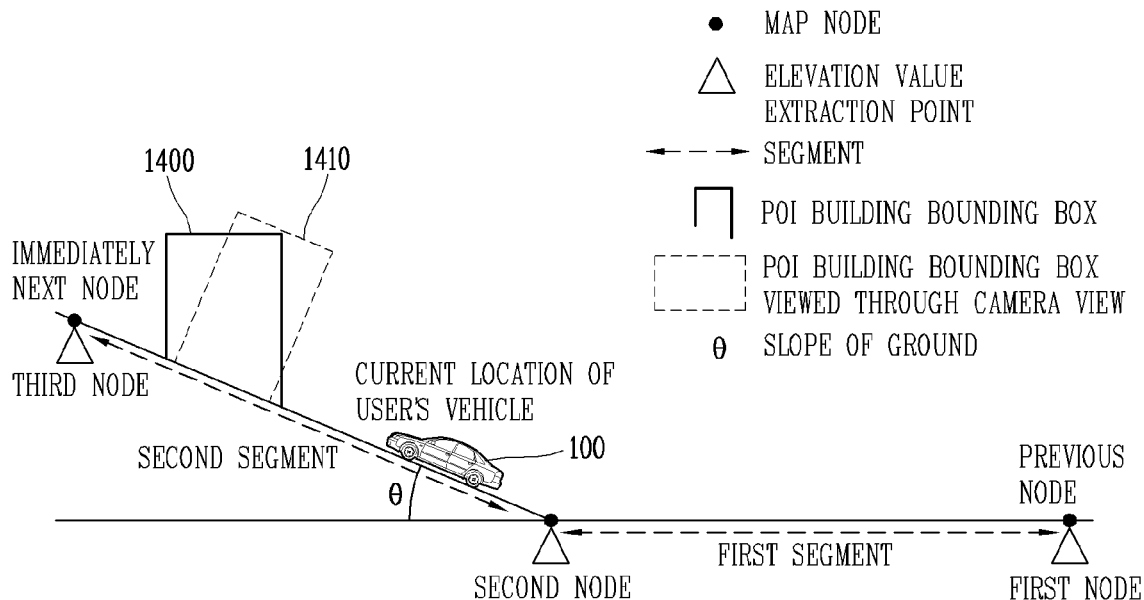

FIGS. 14A, 14B and 14C are conceptual views illustrating a method for outputting an AR image on a building when a vehicle of the present disclosure is traveling on an inclined road.

The processor 870 may determine a slope of the road on which the vehicle is traveling from map information. The processor 870 may tilt a solid figure to correspond to the determined slope, so as to match the solid figure with a building corresponding to destination information.

Specifically, the processor 870 may control the display unit 251 to output the graphic object associated with the destination information based on the solid figure tilted to correspond to the slope.

That is, the processor 870 may tilt the solid figure to correspond to the slope, and control the display unit 251 so that the graphic object associated with the destination information is output in augmented reality by being overlaid on the tilted solid figure.

Referring to FIG. 14A, the processor 870 may extract elevation information regarding a building corresponding to destination information from map information. In general, the elevation information may be defined for each node of a map constituting a road in the map information.

Elevation value extraction points may include a first node location that is a specific distance before the current location of the vehicle 100, and may be defined up to a second node to which the vehicle 100 is to approach next, and a third node located right after passing through a building 1400 (POI building) corresponding to the destination information.

When the first to third nodes are defined, the processor 870 may define segments (a first segment and a second segment) each including two nodes adjacent to each other.

For example, as illustrated in FIG. 14A, the processor 870 may define the first segment including the first node and the second node, and a second segment including the second node and the third node. The number of segments may be defined as (total number of nodes-1).

Based on an elevation value for each node, the processor 870 may calculate an elevation change rate (slope) of the segments.

The elevation change rate (slope) may be defined as a difference between an elevation value of a front node and an elevation value of a previous node in the sequence of the traveling direction.

Accordingly, the change rate of the first segment may be calculated by (the elevation value of the second node—the elevation value of the first node).

The processor 870 may determine that the road is uphill when the change rate is positive, downhill when the change rate is negative, and level when the change rate is 0 without a change.

As illustrated in FIG. 14A, when the processor 870 determines the road to be level as the elevation change rate of the first segment corresponding to the current location of the vehicle 100 is 0, the processor 870 may output an AR image (the graphic object associated with the destination) of a POI building (the building corresponding to the destination information) as it is in an overlaying manner without tilting the AR image.

This may result from that the POI building is located perpendicular to a viewing direction of a camera.

On the other hand, as illustrated in FIG. 14B, when the current location of the vehicle 100 enters the second segment (i.e., enters a segment in which the building corresponding to the destination information exists), the processor 870 may determine the slope of the second segment.

When it is determined that the slope (elevation change rate) of the second segment corresponding to the current location of the vehicle 100 is positive or negative (uphill or downhill), the processor 870 may tilt a solid FIG. 1410 including the building 1400 by the elevation change rate (slope).

An angle by which the solid FIG. 1410 is tilted may be the same as the slope (height change rate) of the ground according to the trigonometric function, as illustrated in (a) of FIG. 14C.

A direction in which the solid FIG. 1410 is tilted may vary depending on whether the slope is positive or negative, and as illustrated in (b) of FIG. 14C, the tilted direction may be determined as a direction in which the solid FIG. 1410 matches the building.

For example, the solid figure may be tilted to lie down by the calculated angle of the ground in case of an uphill, and tilted to be pulled forward in case of a downhill.

With this configuration, when a building is erected in a direction of gravity but a road is tilted, it may be determined that the building is tilted from the perspective of the vehicle, but this may be reflected to tilt a solid figure including the building and a graphic object associated with destination information may be output in augmented reality to be overlaid on the tilted solid figure, thereby realizing optimized augmented reality.

FIGS. 15A, 15B, 15C, 15D, and 15E are conceptual views illustrating a method for outputting, by a vehicle control device of the present disclosure, an AR image related to a destination on a building.

The processor 870 may control the display unit 251 so that the graphic object associated with the destination information is output with being spaced apart from the ground by a predetermined distance.

That is, the processor 870 may implement the augmented reality such that the building corresponding to the destination information is shown to the user in a state of being spaced apart from the ground by the predetermined distance.

Figure 15A:
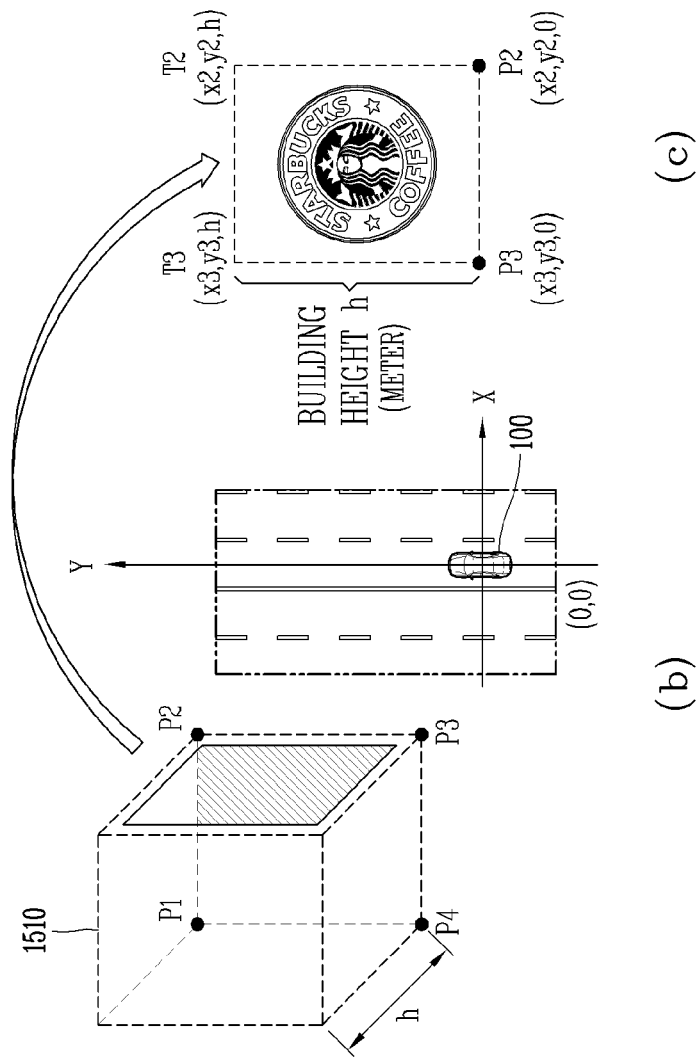
FIGS. 15A, 15B, 15C, 15D, and 15E are conceptual views illustrating a method for outputting, by a vehicle control device of the present disclosure, an AR image related to a destination on a building.

Referring to (a) of FIG. 15A, the processor 870 may receive a graphic object (emblem) associated with destination information from a cloud server, the Internet, or an external device through the interface unit 810, or receive a graphic object 1500 associated with the destination information from the memory of the vehicle or the vehicle control device.

The graphic object 1500 may have a predetermined ratio of width and height.

As illustrated in (b) of FIG. 15A, the processor 870 may determine a solid FIG. 1510 including a building on which the graphic object is to be output, and set coordinates of the graphic object, as illustrated in (c) of FIG. 15A, so that the graphic object can be output on the determined surface.

For example, the processor 870 may obtain vertex coordinates P1, P2, P3, and P4 of the solid figure of the building in a 3D coordinate system based on the vehicle, and a height h of the building.

Thereafter, the processor 870 may perform texture mapping (OpenGL) for the graphic object (emblem image) of a pixel coordinate system into the 3D coordinate system P2, P3, T3, T2, followed by projection to the camera view, so that the graphic object can be displayed in augmented reality by being overlaid on the building. In this case, when projecting the graphic object, the processor 870 may rotate the graphic object by a slope angle of a road so as to implement AR such that the graphic object can appear to be drawn on a surface of the building.

Here, a projection matrix may be calculated and stored in advance through camera calibration.

Figure 15B:
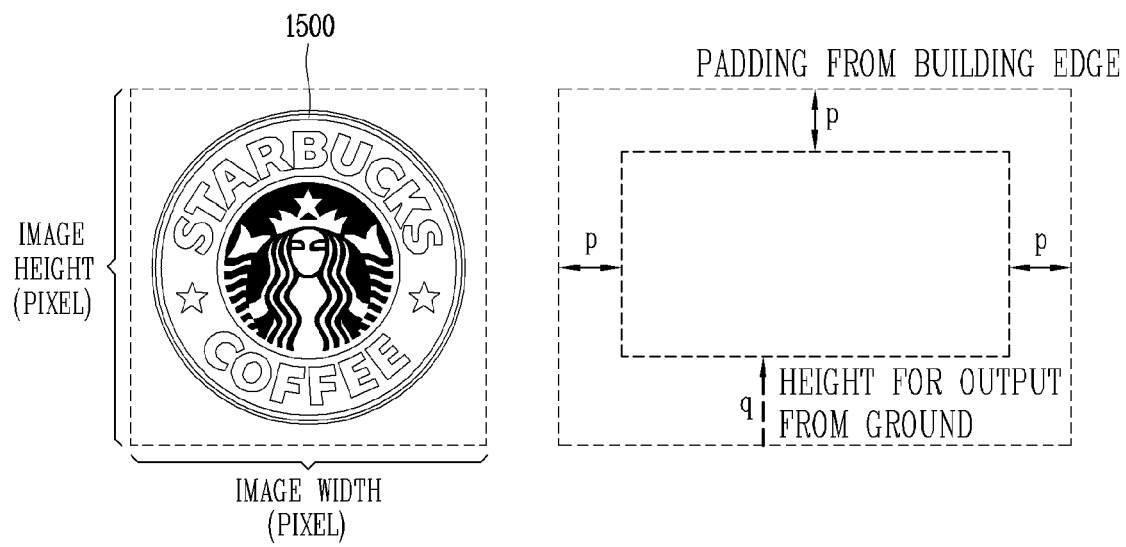

As illustrated in FIG. 15B, the processor 870 may set a height q at which the graphic object is to be displayed from the ground and an extra gap (padding) p from building edges.

The processor 870 may control the display unit to output the graphic object associated with the destination information with being spaced apart from the ground by the predetermined distance q.

Also, the processor 870 may output the graphic object in a different size based on a size of at least one surface determined to output the graphic object associated with the destination information.

That is, the processor 870 may output the graphic object while maintaining the paddings p and the predetermined height q from the ground. Accordingly, the size of the graphic object may vary depending on the size of the surface of the building on which the graphic object is to be output.

Figure 15C:
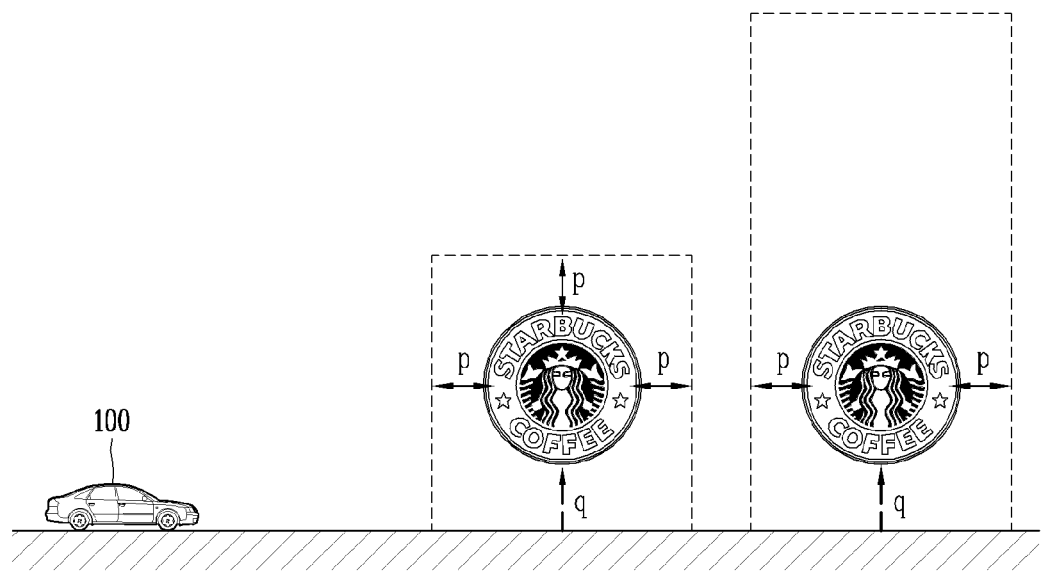

For example, as illustrated in FIG. 15C, even if the graphic object is output to a surface having a different size, the processor 870 may output the graphic object such that the height q from the ground and the paddings from the building edges (here, an edge facing the ground among the building edges is excluded).

Figure 15D:
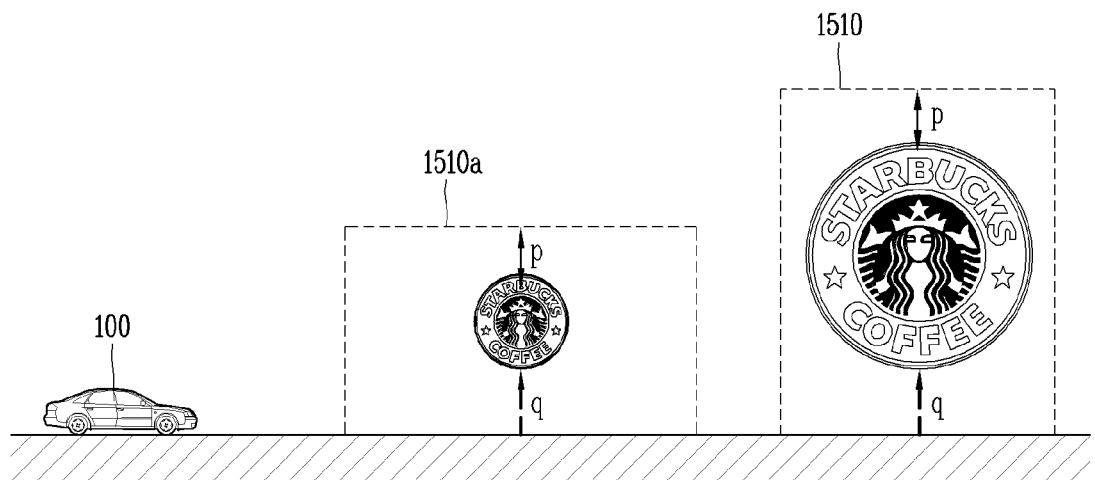

As another example, as illustrated in FIG. 15D, when the height of the building is changed, an output size of the graphic object may be changed while maintaining the paddings from the building edges.

On the other hand, as illustrated on the right side of FIG. 15C, even if the building is high, the processor 870 may control the display unit 251 to output the graphic object in augmented reality on the building while maintaining the ratio of the graphic object.

On the other hand, when an adjacent building exists around the building corresponding to the destination information and the graphic object and the adjacent building overlap each other, the processor 870 may also change the predetermined distance to avoid the overlap between the adjacent building and the graphic object.

That is, when a surface of the building on which the graphic object is to be displayed is obscured by the adjacent building, the processor 870 may increase the predetermined distance q from the ground, which is set for the graphic object to be output, in order to prevent the graphic object from being output with being overlaid on the adjacent building.

This can be applied when the building corresponding to the destination information is higher than the adjacent building, and the processor 870 may change the predetermined distance to be long such that the graphic object can be output to the building at a position higher than the adjacent building.

That is, the processor 870 may control the size of the graphic object so that the graphic object associated with the destination information is displayed to the user in a different size according to the size of the surface of the building on which the graphic object is overlaid in augmented reality.

When a width of a surface on which the graphic object is determined to be output is greater than a width of the graphic object, the processor 870 may change a display position, at which the graphic object is to be output, based on the movement of the vehicle.

When the vehicle enters within a preset distance based on the solid figure, the processor 870 may change the display position of the graphic object along the traveling direction of the vehicle so that the distance between the vehicle and the graphic object is kept constant.

When the graphic object reaches a boundary line of a region in which the graphic object is set to be output on the determined surface, the processor 870 may maintain the state in which the graphic object has reached the boundary line even if the distance between the vehicle and the graphic object decreases.

Thereafter, when the vehicle passes the building, the processor 870 may stop the output of the graphic object.

Figure 15E:
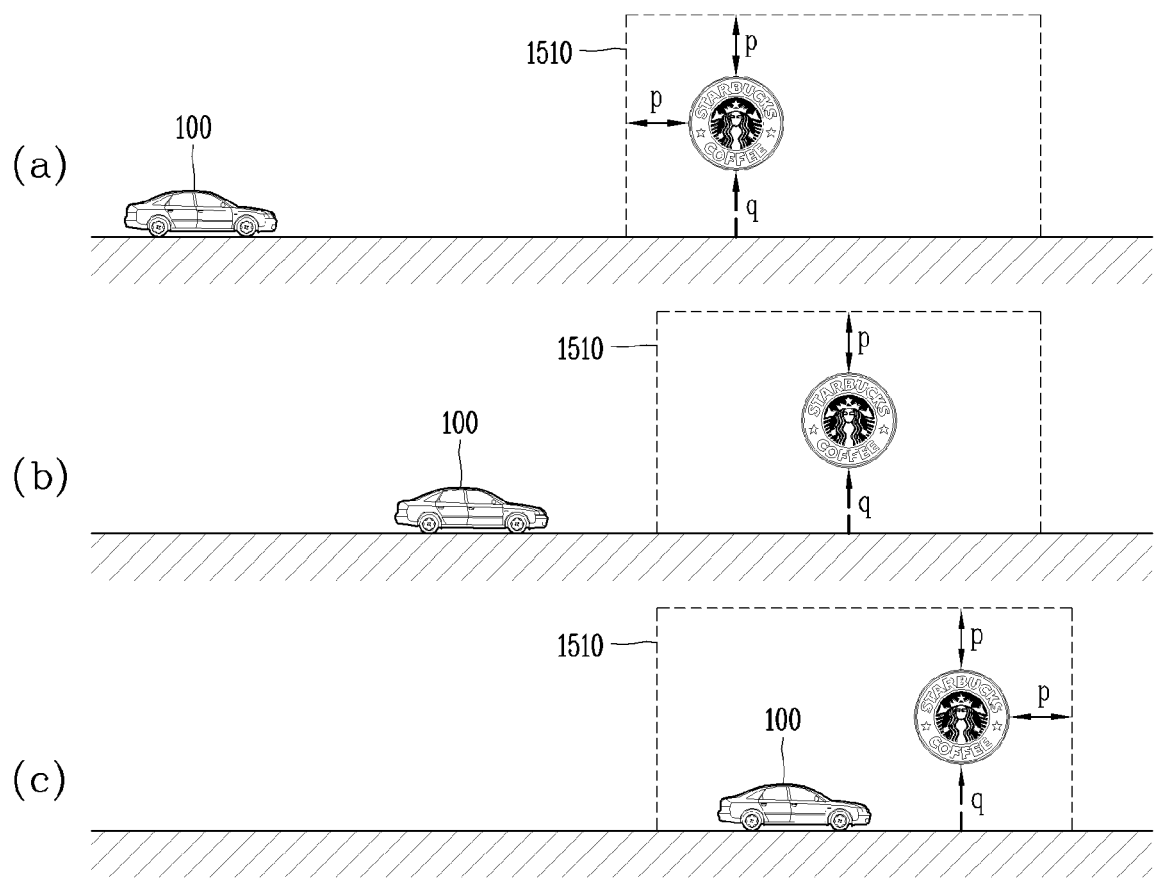

For example, as illustrated in (a) to (c) of FIG. 15E, when the vehicle enters within a preset distance based on a solid FIG. 1510 of a building where the graphic object is set to be output, the processor 870 may change the display position of the graphic object along the traveling direction of the vehicle so as to maintain the constant distance between the graphic object and the vehicle 100.

Then, when the graphic object reaches a boundary line at which the graphic object can no longer move, as illustrated in (c) of FIG. 15E, the processor 870 may maintain the graphic object in the state it has reached the boundary line even if the distance between the vehicle and the graphic object decreases.

FIGS. 16A, 16B, 16C, and 16D are conceptual views illustrating a method for outputting an AR image when coordinates of a building including a destination cannot be obtained.

When spatial coordinates of the building corresponding to the destination information and spatial coordinates of the adjacent building do not exist in the map information, the processor 870 may control the display unit to output a pre-generated solid figure in the vicinity of the building corresponding to the destination information and to output the graphic object on the pre-generated solid figure.

Specifically, the processor 870 may output virtual buildings (i.e., pre-generated solid figures), which substitutes for a POI building 1600 in the vicinity of the building corresponding to the destination information in cases where the processor 870 cannot extract (receive) a shape (spatial coordinates, solid figure) of the building (POI building) 1600 corresponding to the destination information from a map, cannot infer the shape (spatial coordinates, solid figure) of the building from adjacent candidate buildings, and cannot detect the building because there is an object obscuring the building by a specific area or more through image recognition by a camera.

Figure 16A:
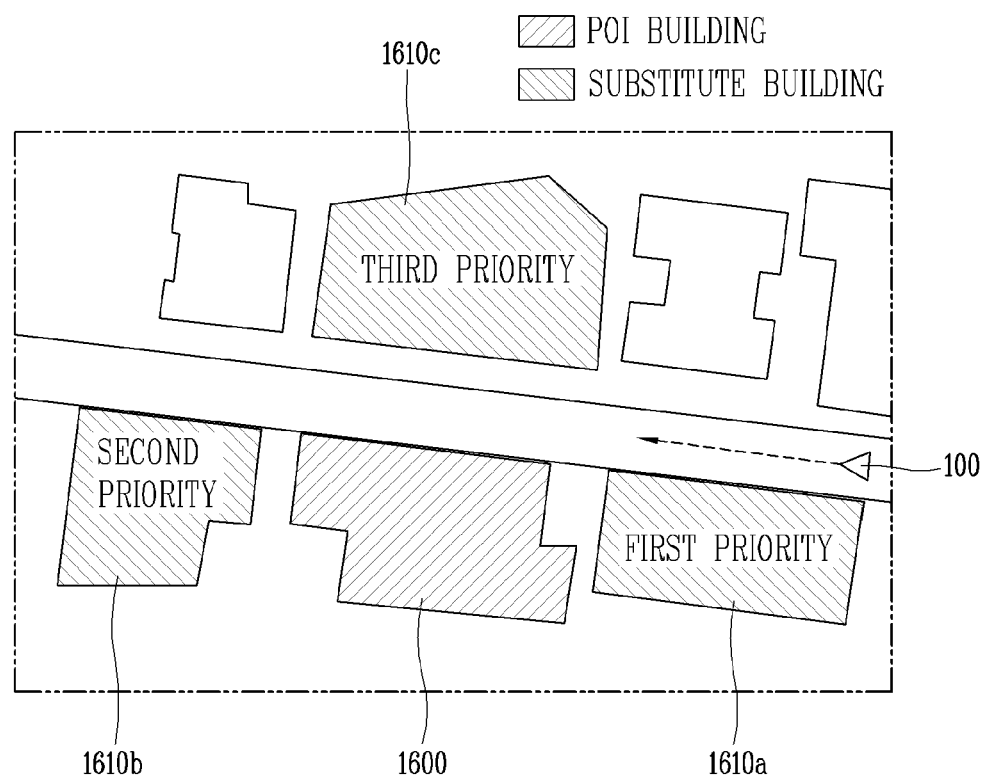

The pre-generated solid figures (virtual buildings) 1610a, 1610b, and 1610c may have priorities of output positions, as illustrated in FIG. 16A.

Based on the traveling direction of the vehicle 100, a first priority may be set for a building 1610a immediately before the POI building 1610a, a second priority may be set for a building 1610b immediately after the POI building, and a third priority may be set for a building 1610c opposite to the POI building.

As illustrated in (a) of FIG. 16B, when spatial coordinates of the building corresponding to the destination information and spatial coordinates of the adjacent buildings do not exist in map information, the processor 870 may control the display unit 251 such that the pre-generated solid figure (virtual building 1610a) is output in the vicinity of the building corresponding to the destination information (a position immediately before the building in case of the first priority), and a graphic object 1630 associated with the destination information and an indicator 1622 indicating the building corresponding to the destination information are overlaid in augmented reality onto the pre-generated solid figure.

Additionally, as illustrated in (b) of FIG. 16B, additional information 1640a indicating that the destination information exists in the next building based on the pre-generated solid figure may be further output to the display unit 251.

As illustrated in (a) of FIG. 16C, when spatial coordinates of the building corresponding to the destination information and spatial coordinates of the adjacent buildings do not exist in map information, the processor 870 may control the display unit 251 such that the pre-generated solid figure (virtual building 1610a) is output in the vicinity of the building corresponding to the destination information (a position immediately after the building in case of the second priority), and the graphic object 1630 associated with the destination information and the indicator 1622 indicating the building corresponding to the destination information are overlaid in augmented reality onto the pre-generated solid figure.

Additionally, as illustrated in (b) of FIG. 16C, additional information 1640b indicating that the destination information exists in a building before the pre-generated solid figure may be further output to the display unit 251.

As illustrated in (a) of FIG. 16D, when spatial coordinates of the building corresponding to the destination information and spatial coordinates of the adjacent buildings do not exist in map information, the processor 870 may control the display unit 251 such that the pre-generated solid figure (virtual building 1610a) is output in the vicinity of the building corresponding to the destination information (a position opposite to the building in case of the third priority), and the graphic object 1630 associated with the destination information and the indicator 1622 indicating the building corresponding to the destination information are overlaid in augmented reality onto the pre-generated solid figure.

Additionally, as illustrated in (b) of FIG. 16D, additional information 1640c indicating that the destination information exists in the building opposite to the pre-generated solid figure may be further output to the display unit 251.

When a preset condition is satisfied, the processor 870 may stop outputting the graphic object in augmented reality based on the location of the vehicle 100 and a center point of the POI building (the building corresponding to the destination information).

The preset condition may include a case where a distance between the location of the vehicle and the center point of the building is less than or equal to a specific distance, a case where an angle between the location of the vehicle and the center point of the building is less than or equal to a specific angle, and a case where a displayed AR image (graphic object) exceeds a viewing angle of a camera by a specific area or more, and the like.

Thereafter, when the graphic object displayed on one surface of the building disappears due to the condition, the processor 870 may also make the graphic object displayed on another surface of the building disappear based on the following condition.

The following condition may include a case where a specific time has elapsed and a case where the angle or distance is less than or equal to a specific distance or angle.

In addition, when a vehicle/pedestrian recognition result is overlaid on a building pixel region recognized from a camera image, the processor 870 may control the display unit 251 such that a corresponding AR image (graphic object) is not output to an overlaid surface.

Also, when there is no risk of collision with a vehicle/pedestrian, the processor 870 may display the AR image (graphic object) on the overlapped region by applying transparency.

FIG. 17 is a flowchart illustrating a method by which a vehicle control device of the present disclosure outputs an AR image on a building of a destination.

Referring to FIG. 17, when destination information is received, the vehicle control device 800 (or AR engine) according to the present disclosure may request for a search for adjacent main POI buildings (S1700).

The navigation system 770 may search for the main buildings within a specific radius on a map, and transmit vertex data (spatial coordinates) of searched one or more POI buildings to the AR engine 800 (S1702, S1704).

The AR engine 800 may change each vertex (latitude and longitude coordinates) into a 3D coordinate system based on the vehicle (S1706) and fit a bounding box (S1708).

Thereafter, the AR engine 800 may request for road elevation values from the vehicle to the POI buildings (S1710), and the navigation system 770 may transmit the road elevation values to the AR engine (S1712).

The AR engine 800 may then calculate a slope angle of the road from the elevation values and rotate the 3D coordinate system by the angle (S1714, S1716).

The AR engine 800 may check a remaining distance (S1718). When the remaining distance is shorter than X2, the AR engine 800 may perform blinking monochromatic texture mapping on a front surface of a virtual building (S1728).

When the remaining distance is longer than X2, the AR engine 800 may perform texture mapping from a 2D emblem image into a 3D space (S1726).

On the other hand, the navigation system 770 may request for metadata of representative latitude and longitude values of the POI buildings from a POI service client 1700 (S1720).

The POI service client 1700 may perform POI database search and transmit metadata such as a business name, address, emblem, and images corresponding to the latitudes and longitudes to the AR engine (S1724).

The AR engine 800 may project an AR image such as the emblem on a building (S1730).

Figure 18:
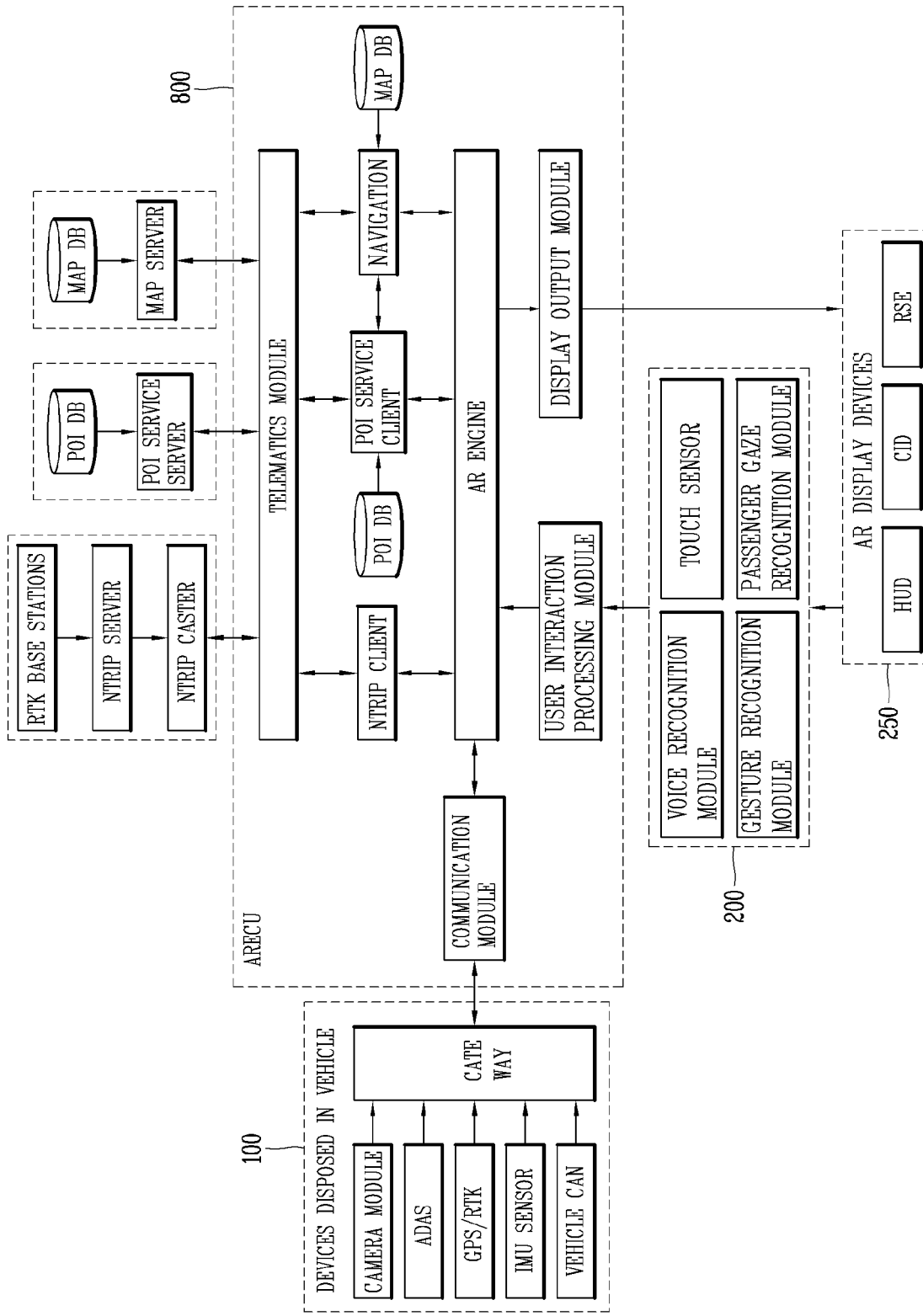
FIG. 18 is a conceptual view illustrating a system including a vehicle control device in accordance with one implementation.

FIG. 18 is a conceptual view illustrating a system including a vehicle control device in accordance with one implementation.

As illustrated in FIG. 18, the vehicle control device 800 of the present disclosure may include various components, and perform communication with various components such as the vehicle 100, the user input device 200, and the output unit 250.

FIGS. 19, 20, 21 and 22 are conceptual views illustrating different examples of outputting an AR image according to a distance between a vehicle and a building including a destination.

Figure 19:
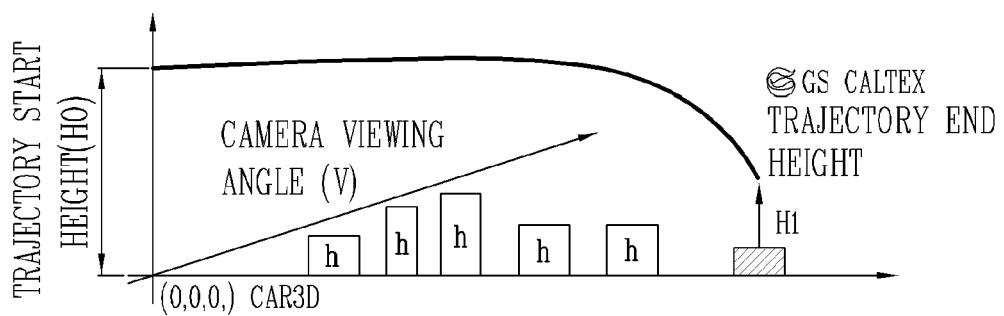

Referring to FIG. 19, the processor 870 may a parameter with an optimal trajectory based on building height profiles of map data.

Specifically, the processor 870 may collect height and elevation information of buildings existing in a road region up to a POI location based on a vehicle camera, and collect pixel coordinates that roof locations of the buildings are projected onto a camera view.

Here, even taller buildings may appear smaller in the camera view if they are farther away.

The processor 870 may select the tallest building from among the collected vertical pixel coordinates of the roofs of the buildings, and calculate a trajectory end height by projecting the vertical pixel coordinates of the selected tallest building to the camera view.

Figure 20:
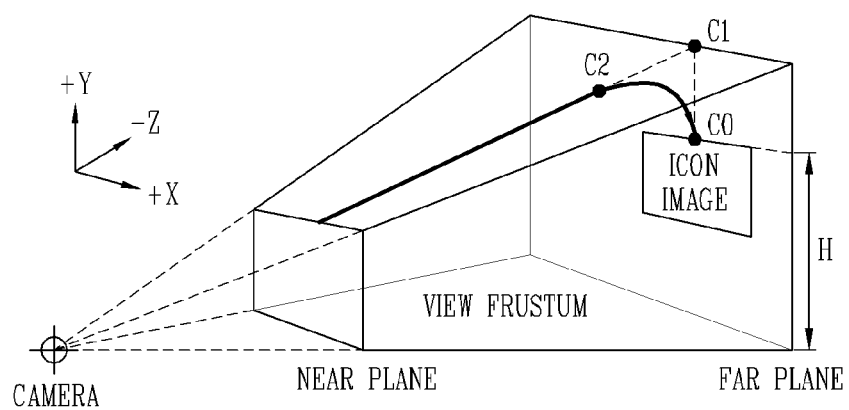

Then, referring to FIG. 20, the processor 870 may calculate C0, C1, and C2 corresponding to the degree of curve smoothness defined in advance from a trajectory height H, and determine an optimal trajectory height H calculated from the building height profiles.

The processor 870 may apply the Bezier curve equation to calculate a smooth curve.

Specifically, the processor 870 may calculate vertex information on a path using a parameterized curve such as a Bezier curve (C0, C1, and C2 of FIG. 20 are used as control points).

The processor 870 may set a trajectory end point at a Z point of the camera frustum, and place the trajectory end point and an icon on a far plane in the case of FIG. 20.

The trajectory shape may be colored according to a design result, and texture may be used when a complex shape is required.

Figure 21:
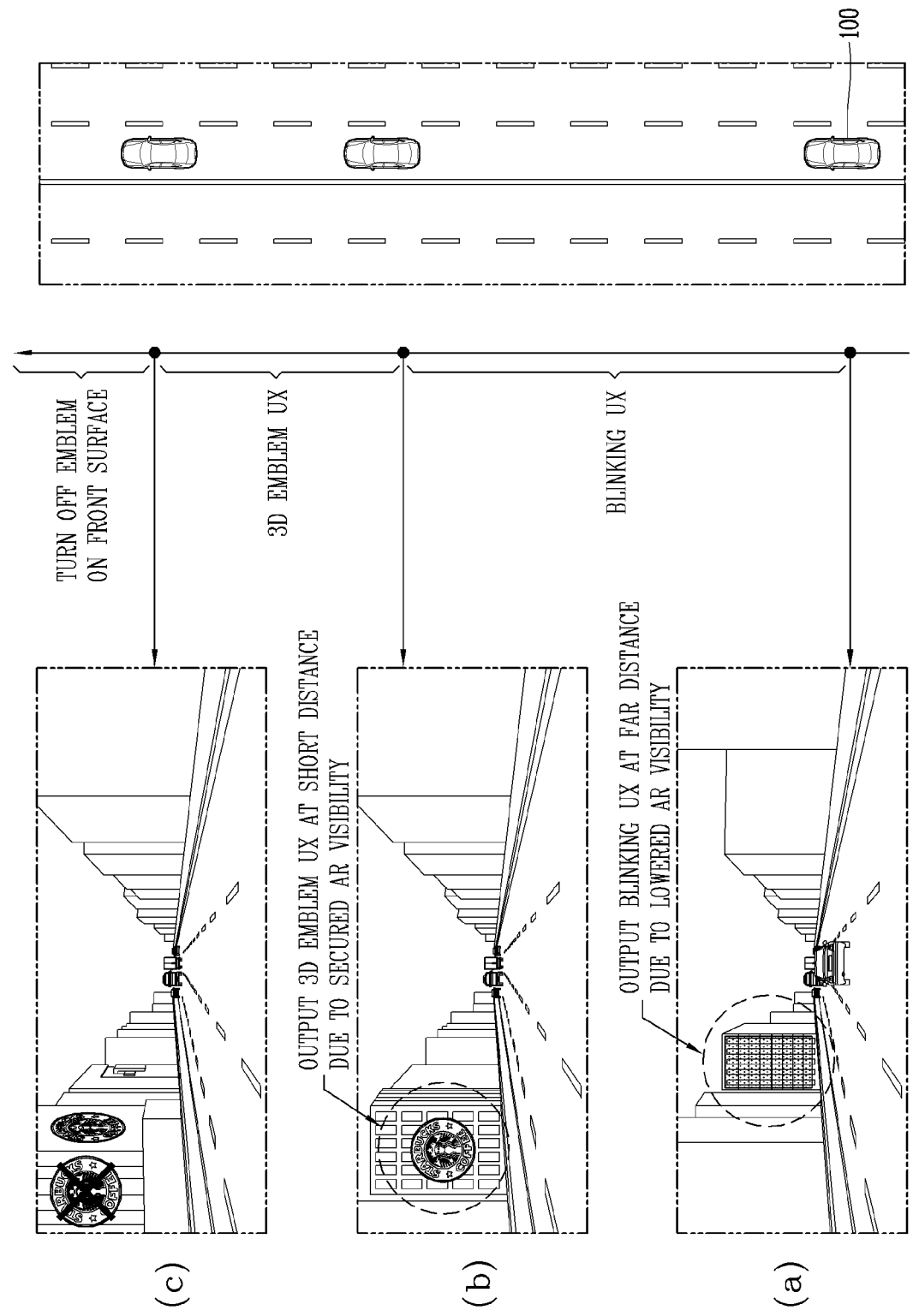

Referring to (a) of FIG. 21, when the vehicle 100 is far from the building corresponding to the destination information, the processor 870 may use a blinking UX due to lowered AR visibility at a far distance.

Referring to (b) of FIG. 21, when the distance between the vehicle and the building decreases, the processor 870 may output a graphic object (emblem) related to destination information in augmented reality onto a plurality of surfaces of the building.

Referring to (c) of FIG. 21, when the distance between the vehicle and the building is shorter than a threshold value, the processor 870 may stop the output of the graphic object which is being displayed and output the graphic object to another surface.

Meanwhile, as illustrated in FIG. 22, when the building corresponding to the destination information is not visible through the camera view, the processor 870 may display direction and sense of distance of the POI with a parabolic trajectory. At this time, the technology described with reference to FIGS. 19 and 20 may be applied.

According to an implementation of the present disclosure, one or more of the following effects can be achieved.

First, according to the present disclosure, an AR technology that is optimized to provide a user with a graphic object associated with a destination on a building corresponding to the destination can be provided.

Second, according to the present disclosure, a graphic object associated with a destination can be displayed to be overlaid on a building by reflecting a slope of a road, thereby providing a user interface capable of accurately outputting AR information onto a building even on a tilted road.

The effects of the present disclosure may not be limited to those effects mentioned above, and other effects not mentioned may be clearly understood by those skilled in the art from the description of the appended claims.

The vehicle control device 800 described above may be included in the vehicle 100.

The operation or control method of the vehicle control device 800 described above may be applied to an operation or control method of the vehicle 100 (or the control unit 170) in the same or similar manner.

For example, more detailed implementations of the control method of the vehicle 100 (or the control method of the vehicle control device 800) may be understood by the foregoing description or analogously applied in the same/similar manner.

Each of the steps may be performed not only by the vehicle control device 800 but also by the controller 170 provided in the vehicle 100.

Further, all functions, configurations, or control methods performed by the vehicle control device 800 described above may be performed by the controller 170 provided in the vehicle 100. That is, all of the control methods described in this specification may be applied to a control method of a vehicle or a control method of a control device.

Further, the vehicle control device 800 described above may be a mobile terminal. Further, all functions, configurations, or control methods performed by the vehicle control device 800 described above may be performed by a controller provided in the mobile terminal. In addition, all the control methods described in this specification can be applied to a method of controlling a mobile terminal in the same/like manner.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. The computer may include the processor or the controller. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A vehicle control device comprising:
an interface unit including a port and connected to a display disposed in a vehicle; and
a processor configured to control the display disposed in the vehicle through the port of the interface unit,
wherein the processor receives destination information through the port of the interface unit to obtain spatial coordinates of a building corresponding to the destination information from map information, and
controls the display such that a graphic object related to the destination information is displayed to be overlaid on the building based on the spatial coordinates of the building corresponding to the destination information,
wherein the processor determines an adjacent building of the building corresponding to the destination information when the spatial coordinates of the building corresponding to the destination information do not exist in the map information, and renders a solid figure including the building corresponding to the destination information based on spatial coordinates of the adjacent building.

2. The vehicle control device of claim 1, wherein the processor renders the solid figure including the building using the spatial coordinates of the building, and controls the display such that the graphic object related to the destination information is output on at least one of a plurality of surfaces defining the solid figure.

3. The vehicle control device of claim 2, wherein the processor determines an angle between a traveling direction of the vehicle and the solid figure including the building based on a current location of the vehicle and the spatial coordinates of the building, and determines the number of surfaces, on which the graphic object related to the destination information is to be output on the solid figure, based on the determined angle.

4. The vehicle control device of claim 3, wherein the processor controls the display to output the graphic object to any one of the plurality of surfaces of the solid figure when the determined angle is a first angle smaller than a preset angle, and
controls the display to output the graphic object to at least two of the plurality of surfaces of the solid figure when the determined angle is a second angle greater than the preset angle.

5. The vehicle control device of claim 4, wherein the processor increases the number of outputs of the graphic object, based on a change in angle from the first angle to the second angle as the vehicle travels.

6. The vehicle control device of claim 4, wherein the one surface varies depending on whether another building exists between the building and the vehicle.

7. The vehicle control device of claim 2, wherein the processor determines a slope of a road, on which the vehicle is traveling, from the map information, and matches the solid figure with the building corresponding to the destination information by tilting the solid figure to correspond to the determined slope.

8. The vehicle control device of claim 7, wherein the processor controls the display to output the graphic object related to the destination information based on the solid figure tilted to correspond to the slope.

9. The vehicle control device of claim 2, wherein the port of the interface unit is connected to a camera disposed in the vehicle to perform communication with the camera, and
wherein the processor receives an image from the camera disposed in the vehicle, detects edge components for a building region from the received image, and uses the edge components to match the solid figure including the building with the destination information.

10. The vehicle control device of claim 2, wherein the processor outputs the graphic object in a different size based on a size of at least one surface determined to output the graphic object thereon.

11. The vehicle control device of claim 2, wherein the processor changes a display position, at which the graphic object is to be output, based on movement of the vehicle when a width of a surface on which the graphic object is determined to be output is greater than a width of the graphic object.

12. The vehicle control device of claim 11, wherein the processor changes the display position of the graphic object along a traveling direction of the vehicle so that a distance between the vehicle and the graphic object is kept constant when the vehicle enters within a preset distance based on the solid figure.

13. The vehicle control device of claim 12, wherein when the graphic object reaches a boundary line of a region in which the graphic object is set to be output on the determined surface on which the graphic object is determined to be output, the processor maintains the state in which the graphic object has reached the boundary line even if the distance between the vehicle and the graphic object decreases.

14. The vehicle control device of claim 1, wherein the processor controls the display so that the graphic object related to the destination information is output with being spaced apart from a ground by a predetermined distance.

15. The vehicle control device of claim 14, wherein the processor changes the predetermined distance such that the graphic object does not overlap the adjacent building when the adjacent building exists in the vicinity of the building corresponding to the destination information and the graphic object and the adjacent building overlap each other.

16. The vehicle control device of claim 1, wherein the processor controls the display to output a pre-generated solid figure in the vicinity of the building corresponding to the destination information and to output the graphic object on the pre-generated solid figure when the spatial coordinates of the building corresponding to the destination information and the spatial coordinates of the adjacent building do not exist in the map information.

17. The vehicle comprising the vehicle control device according to claim 1.

18. A method for controlling a vehicle control device, the method comprising:
receiving destination information;
obtaining spatial coordinates of a building corresponding to the destination information from map information; and
controlling a display such that a graphic object related to the destination information is displayed to be overlaid on the building, based on the spatial coordinates of the building corresponding to the destination information,
wherein the controlling further comprises:
determining an adjacent building of the building corresponding to the destination information when the spatial coordinates of the building corresponding to the destination information do not exist in the map information, and rendering a solid figure including the building corresponding to the destination information based on spatial coordinates of the adjacent building.

19. The method of claim 18, wherein the controlling is configured to render the solid figure including the building by using the spatial coordinates of the building, and controls the display to output the graphic object related to the destination information on at least one of a plurality of surfaces defining the solid figure.

* * * * *